US012264926B2

(12) United States Patent
Bhasme et al.

(10) Patent No.: US 12,264,926 B2
(45) Date of Patent: Apr. 1, 2025

(54) SYSTEMS AND METHODS FOR MANAGING VELOCITY PROFILES

(71) Applicant: Electra Vehicles, Inc., Boston, MA (US)

(72) Inventors: Saurabh Bhasme, Allston, MA (US); Fabrizio Martini, Boston, MA (US); Britany Straley, Aliso Viejo, CA (US); Thomas James Couture, Allston, MA (US)

(73) Assignee: ELECTRA VEHICLES, INC., Boston, MA (US)

(*) Notice: Subject to any disclaimer, the term of this patent is extended or adjusted under 35 U.S.C. 154(b) by 218 days.

(21) Appl. No.: 17/912,141

(22) PCT Filed: Mar. 17, 2021

(86) PCT No.: PCT/US2021/022727
§ 371 (c)(1),
(2) Date: Sep. 16, 2022

(87) PCT Pub. No.: WO2021/188647
PCT Pub. Date: Sep. 23, 2021

(65) Prior Publication Data
US 2023/0139003 A1 May 4, 2023

Related U.S. Application Data

(60) Provisional application No. 62/991,413, filed on Mar. 18, 2020.

(51) Int. Cl.
G01C 21/34 (2006.01)
B60W 40/09 (2012.01)
G01C 21/36 (2006.01)

(52) U.S. Cl.
CPC ........ G01C 21/3469 (2013.01); B60W 40/09 (2013.01); G01C 21/3461 (2013.01); G01C 21/3617 (2013.01); B60W 2540/30 (2013.01)

(58) Field of Classification Search
CPC ............ G01C 21/3469; G01C 21/3461; G01C 21/3617; G01C 21/34; B60W 40/09;
(Continued)

(56) References Cited

U.S. PATENT DOCUMENTS 11,161,519 B2 * 11/2021 Phillips ............. B60W 50/0098
11,747,162 B2 * 9/2023 Aggoune ........... G01C 21/3492
701/439

(Continued)

FOREIGN PATENT DOCUMENTS

WO 2011066468 A1 6/2011
WO WO-2020245654 A1 * 12/2020 ........ B60W 30/0953

OTHER PUBLICATIONS

International Search Report and Written Opinion for International Application No. PCT/US2021/022727 dated Feb. 2, 2021.
(Continued)

Primary Examiner — Yonel Beaulieu
(74) Attorney, Agent, or Firm — PIERCE ATWOOD LLP

(57) ABSTRACT

Systems, methods, and at least one computer-readable medium for selecting a velocity profile for an electric vehicle. In some embodiments, a first parameter value may be determined for a road segment in a selection horizon, and a second parameter value may be determined for an energy storage device of the electric vehicle. The first and second parameter values may be used to predict a plurality of velocity profiles over the selection horizon, wherein each velocity profile is predicted based on a corresponding value of a variable relating to a driving style of a driver of the electric vehicle. An energy consumption cost and a travel time cost may be computed for each velocity profile. A velocity profile may be selected from the plurality of velocity profiles, based on the respective energy consumption costs and the respective travel time costs.

20 Claims, 14 Drawing Sheets

(58) Field of Classification Search
CPC ......... B60W 2540/30; B60W 50/0097; B60W 2556/10; B60W 2556/50; B60W 2720/103; B60W 30/143; B60L 15/2045; B60L 58/16; B60L 2240/12; B60L 2240/70; B60L 2250/18; B60L 2260/48; B60L 2260/52; B60L 2260/54; Y02T 10/64; Y02T 10/70; Y02T 10/72; Y02T 90/16

See application file for complete search history.

(56) References Cited

U.S. PATENT DOCUMENTS

| | | | |
|---|---|---|---|
| 12,037,019 | B2* | 7/2024 | Shalev-Shwartz ........................... B60W 60/0015 |
| 2011/0040438 | A1* | 2/2011 | Kluge ................ G01C 21/3469 701/31.4 |
| 2012/0158229 | A1 | 6/2012 | Schaefer |
| 2013/0151047 | A1 | 6/2013 | Choi et al. |
| 2013/0253797 | A1 | 9/2013 | McNew |
| 2014/0058673 | A1 | 2/2014 | Wolf |
| 2015/0168157 | A1 | 6/2015 | Hoch |
| 2015/0344036 | A1 | 12/2015 | Kristinsson et al. |
| 2015/0356635 | A1* | 12/2015 | Thurston ................ B60Q 9/00 705/306 |
| 2017/0136842 | A1* | 5/2017 | Anderson .............. B60K 35/00 |
| 2018/0057001 | A1* | 3/2018 | Hu ................. B60W 30/18027 |
| 2022/0227367 | A1* | 7/2022 | Kario ................ B60W 30/0956 |
| 2023/0064358 | A1* | 3/2023 | Poull .................. B60W 30/143 |
| 2023/0068356 | A1* | 3/2023 | Aggoune ........... G01C 21/3492 |
| 2024/0212144 | A1* | 6/2024 | Neumann ............. G06T 7/0012 |

OTHER PUBLICATIONS

Extended European Search Report from the European Patent Office for Application No. 21772207.3, (EP4121329), dated Mar. 19, 2024.

* cited by examiner

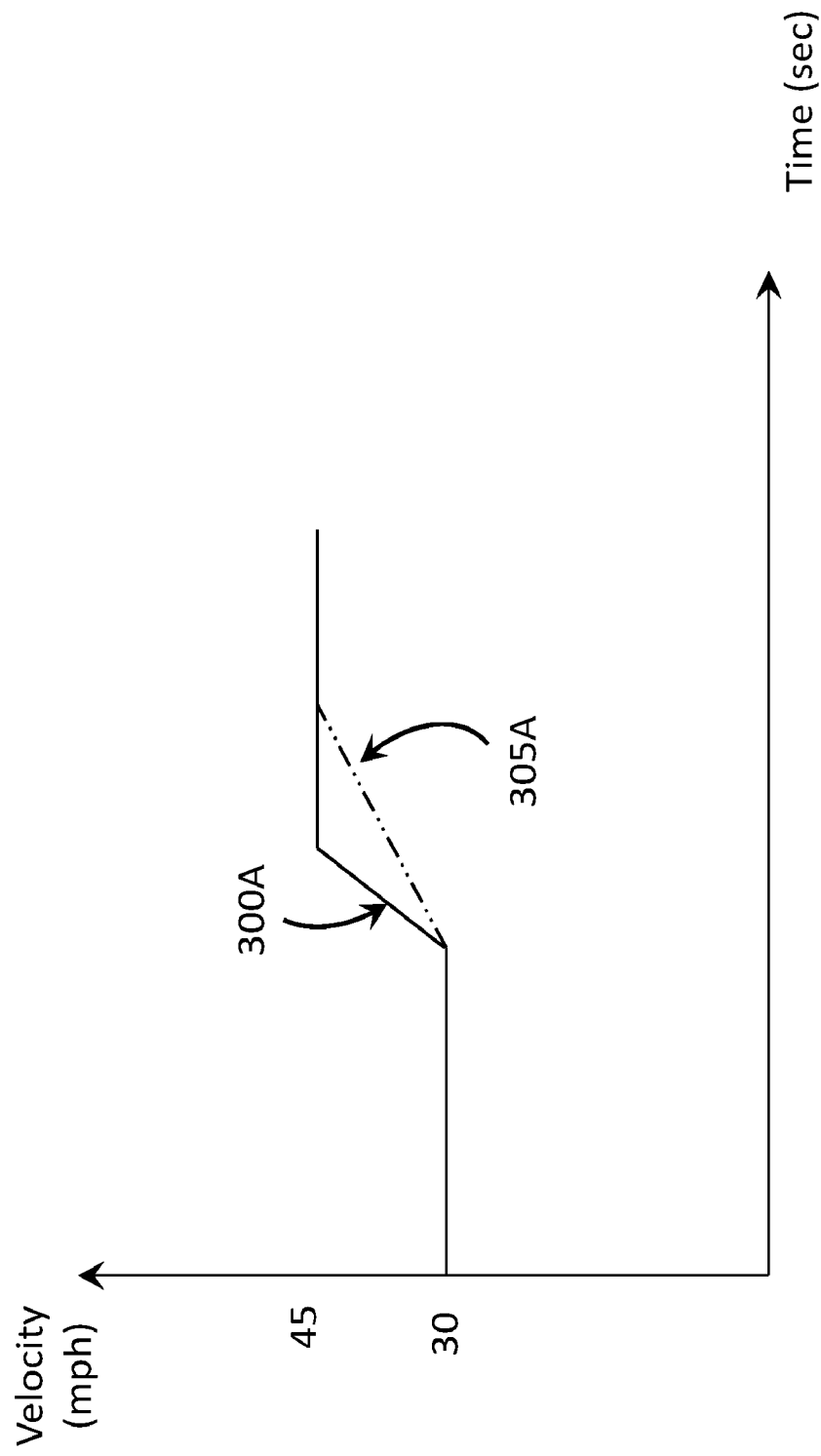

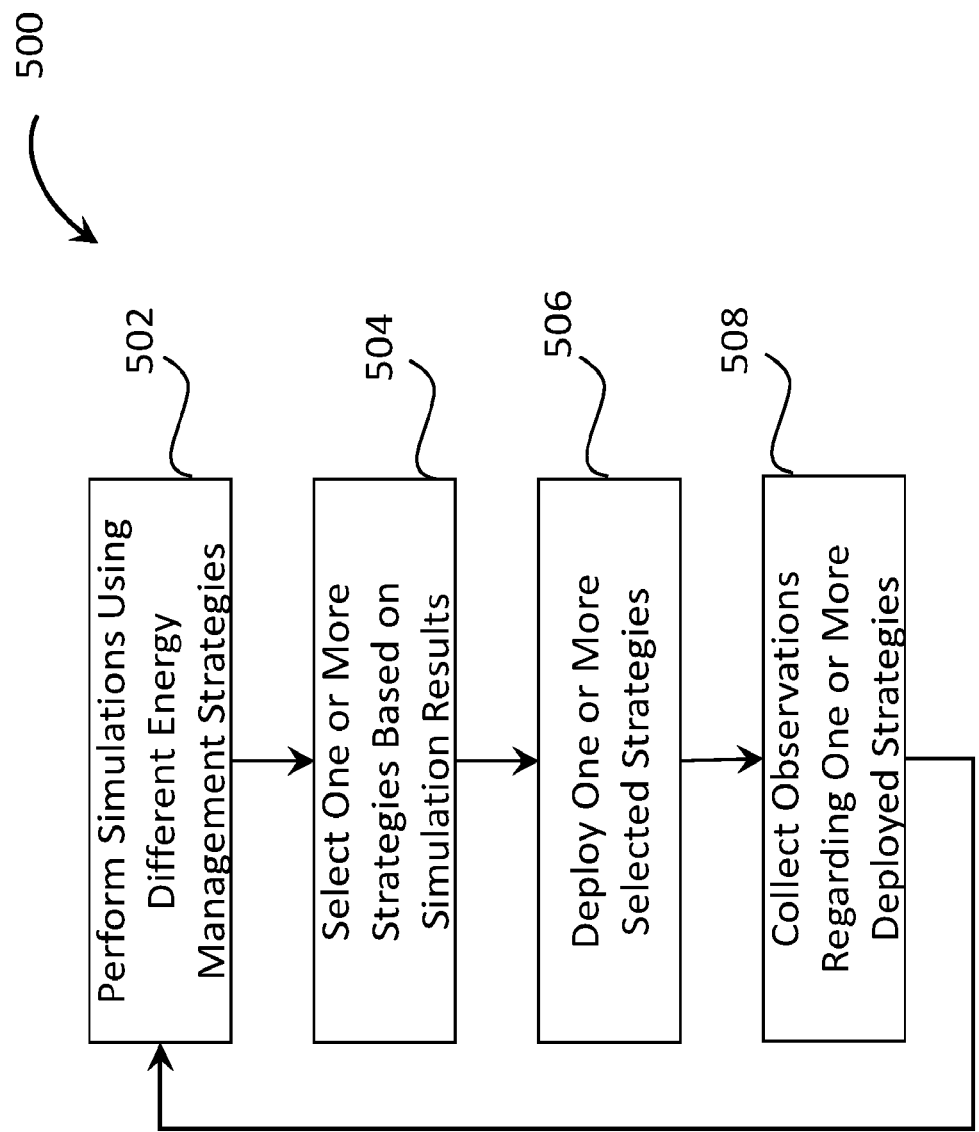

SYSTEMS AND METHODS FOR MANAGING VELOCITY PROFILES

RELATED APPLICATION

This application is a national stage filing under 35 U.S.C. 371 of International Application No. PCT/US2021/022727, filed Mar. 17, 2021, entitled, "SYSTEMS AND METHODS FOR MANAGING VELOCITY PROFILES," which claims the benefit under 35 USC 119 (e) of U.S. Provisional Application No. 62/991,413, entitled "SYSTEMS AND METHODS FOR MANAGING ENERGY STORAGE SYSTEMS," filed on Mar. 18, 2020, the entire contents of each of which is incorporated herein by reference in its entirety.

BACKGROUND

Energy generated or harvested at one point in time may be stored for use at a later point in time using many different types of energy storage devices, such as electrochemical batteries, supercapacitors, lithium capacitors, hydrogen fuel cells, compressed air energy storage, flywheel energy storage, etc. Energy storage devices based on different principles of operation may have different characteristics. For instance, some energy storage devices (e.g., electrochemical batteries) may be able to store large amounts of energy on a unit mass basis and/or a unit volume basis, whereas some energy storage devices (e.g., supercapacitors) may be able to deliver large amounts of power on a unit mass basis and/or a unit volume basis.

Often times, especially when there are constraints such as cost, weight, space, etc., it may be challenging to provide an energy storage device that is able both to store a large amount of energy and to deliver a large amount of power. For instance, design choices (e.g., battery chemistry, electrode configuration, etc.) that are made to achieve higher energy density (and/or specific energy) may lead to lower power density (and/or specific power), and vice versa.

Moreover, in case of an electrochemical battery, a high rate of discharge may produce excessive heat, which may damage the battery and shorten its usable life.

SUMMARY

In accordance with some embodiments, a computer-implemented method is provided for selecting a velocity profile for an electric vehicle, comprising acts of: determining a plurality of parameter values, the plurality of parameter values comprising: at least one first parameter value for at least one road segment in a selection horizon; and at least one second parameter value for at least one energy storage device of the electric vehicle; using the plurality of parameter values to predict a plurality of velocity profiles over the selection horizon, wherein: each velocity profile of the plurality of velocity profiles is predicted based on a corresponding value of at least one variable relating to a driving style of a driver of the electric vehicle; computing an energy consumption cost and a travel time cost for each velocity profile of the plurality of velocity profiles; and selecting, based on the respective energy consumption costs and the respective travel time costs, a velocity profile from the plurality of velocity profiles.

In accordance with some embodiments, a system is provided, comprising at least one computer processor and at least one computer-readable medium having stored thereon instructions which, when executed, program the at least one computer processor to perform any of the methods described herein.

In accordance with some embodiments, at least one computer-readable medium is provided, having stored thereon instructions which, when executed, program at least one computer processor to perform any of the methods described herein.

BRIEF DESCRIPTION OF DRAWINGS

FIG. 3A shows illustrative velocity profiles 300A and 305A, in accordance with some embodiments.

FIG. 5 shows an illustrative process 500 for selecting one or more energy management strategies, in accordance with some embodiments.

DETAILED DESCRIPTION

Figure 1A:
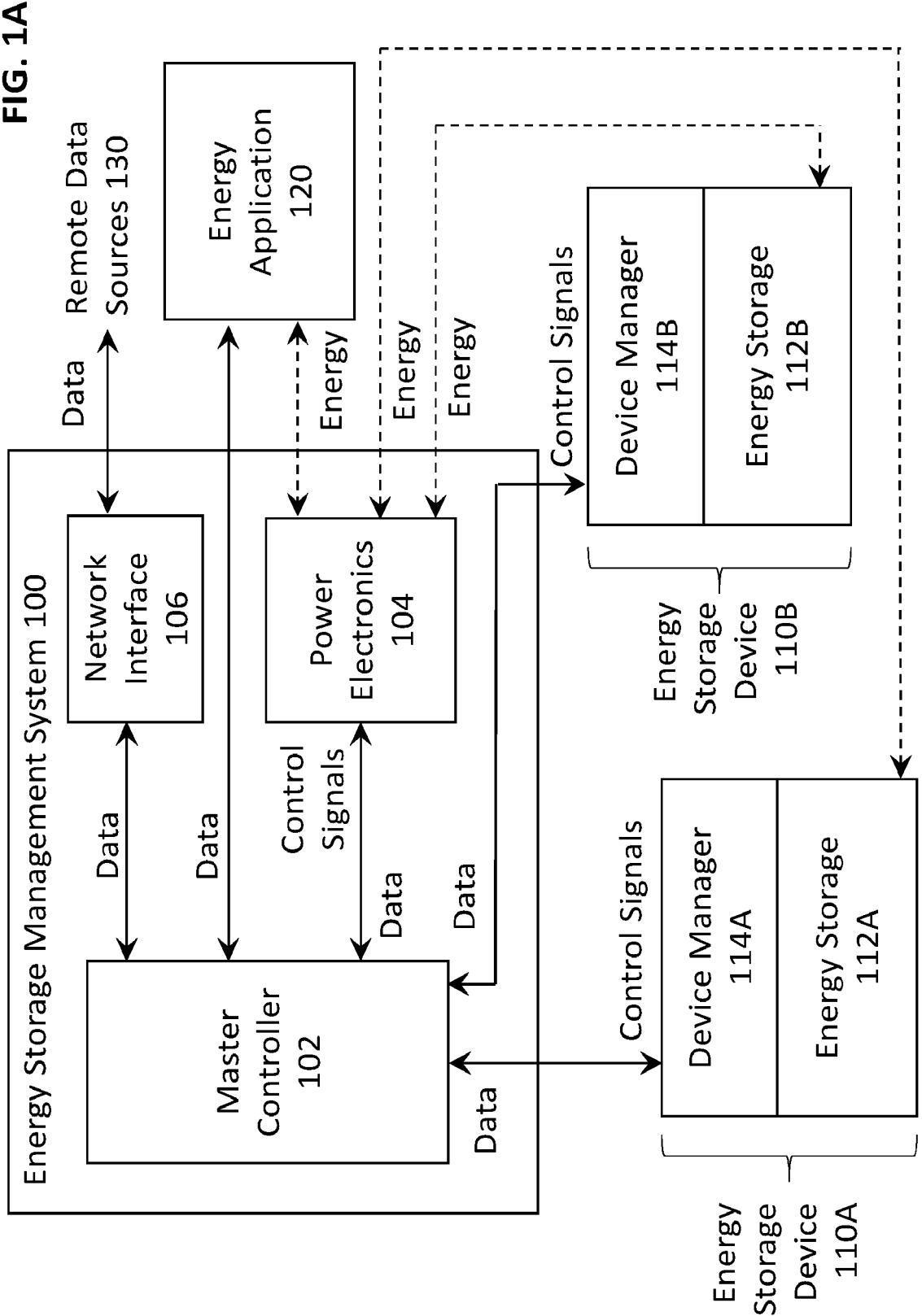
FIG. 1A shows an illustrative energy storage management system 100, in accordance with some embodiments.

The inventors have recognized and appreciated that performance of an energy storage device may vary depending on one or more external conditions (e.g., temperature, humidity, barometric pressure, etc.) and/or one or more internal conditions (e.g., oxidation and/or buildup on electrodes). The one or more internal conditions may, in turn, depend on how the energy storage device has been used in the past. For instance, excessive heat and/or rapid discharge may cause damage to an electrochemical battery.

Accordingly, in some embodiments, techniques are provided for managing energy storage systems in an adaptive manner. For example, techniques may be provided for dynamically controlling charging and/or discharging of one or more energy storage devices, where control decisions may be made based on one or more external conditions and/or one or more internal conditions.

An external or internal condition of an energy storage device may be determined in any suitable manner. For instance, in some embodiments, an external or internal condition may be measured using one or more sensors. Additionally, or alternatively, an external or internal condition may be derived from sensor data and/or other data (e.g., historical data relating to how the energy storage device has been used in the past). For example, an external or internal condition may be predicted by applying one or more models to the sensor data and/or the other data.

In some embodiments, an energy storage system may be provided that includes two or more different types of energy storage devices. Such an energy storage system is sometimes referred to herein as a "heterogeneous" energy storage system. For instance, an energy storage device with a relatively high energy density (and/or specific energy) may be used to meet power demand that is relatively steady. When there is a spike in power demand, an energy storage device with a relatively high power density (and/or specific power) may be used in addition to, or instead of, the energy storage device with a relatively high energy density (and/or specific energy). However, it should be appreciated that aspects of the present disclosure are not limited to using a heterogeneous energy storage system. One or more of the techniques described herein may be used to manage and/or design an energy storage system having one or more energy storage devices of a same type. Such an energy storage system is sometimes referred to herein as a "homogeneous" energy storage system.

It should be appreciated that the techniques introduced above and discussed in greater detail below may be implemented in any of numerous ways, as the techniques are not limited to any particular manner of implementation. Examples of implementation details are provided herein solely for illustrative purposes. Furthermore, the techniques disclosed herein may be used individually or in any suitable combination, as aspects of the present disclosure are not limited to using any particular technique or combination of techniques.

FIG. 1A shows an illustrative energy storage management system 100, in accordance with some embodiments. In this example, the illustrative energy storage management system 100 is used to manage energy storage devices 110A and 110B to supply energy to, and/or receive energy from, an energy application 120. The energy application 120 may be any suitable energy application, such as a vehicle, an appliance, a data center, an electric grid, etc. It should be appreciated that an energy application may fall within one or more of these categories. For instance, a warehouse robot may be both a vehicle and an appliance.

Examples of vehicles include, but are not limited to, land vehicles (e.g., cars, motorcycles, scooters, trams, etc.), watercrafts (e.g., boats, jet skis, hovercrafts, submarines, etc.), aircrafts (e.g., drones, helicopters, airplanes, etc.), and spacecrafts. It should be appreciated that a vehicle may fall within multiple ones of these categories. For instance, a seaplane may be both a watercraft and an aircraft.

Examples of appliances include, but are not limited to, robots, HVAC (heating, ventilation, and air conditioning) equipment, construction equipment, power tools, refrigeration equipment, and computing equipment. Such appliances may be used in any suitable setting, such as a residential setting, a commercial setting, and/or an industrial setting.

In some embodiments, the energy storage devices 110A and 110B may be of different types. For instance, the energy storage device 110A may have a higher energy density (and/or specific energy) compared to the energy storage device 110B. Additionally, or alternatively, the energy storage device 110B may have a higher power density (and/or specific power) compared to the energy storage device 110A. Accordingly, the energy storage device 110A and the energy storage device 110B are sometimes referred to herein as a "high energy" device and a "high power" device, respectively. Thus, it should be appreciated that the terms "high energy" and "high power" are used in a relative sense, as opposed to an absolute sense.

In the example shown in FIG. 1A, the energy storage device 110A includes an energy storage 112A, and the energy storage device 110B includes an energy storage 112B. In some embodiments, the energy storage 112A may include an electrochemical battery, whereas the storage 112B may include a supercapacitor. However, it should be appreciated that aspects of the present disclosure are not limited to using any particular energy storage technology or combination of energy storage technologies. In some embodiments, the energy storage 112A and 112B may both include electrochemical batteries, which may be of a same chemistry or different chemistries. In some embodiments, the energy storage 112A and 112B may both include supercapacitors, or other non-electrochemical energy storage units which may be of a same type or different types.

The energy storage 112A may be of any suitable construction. For instance, the energy storage 112A may use a liquid electrolyte, a solid electrolyte, and/or a polymer electrolyte. Moreover, the energy storage 112A may be a cell, a module, a pack, or another suitable unit that is individually controllable. Likewise, the energy storage 112B may be of any suitable construction, which may be the same as, or different from, the construction of the energy storage 112A. For instance, the energy storage 112B may use a liquid electrolyte, a solid electrolyte, and/or a polymer electrolyte. Moreover, the energy storage 112B may be a cell, a module, a pack, or another suitable unit that is individually controllable.

In some embodiments, one or both of the energy storage device 110A and the energy storage device 110B may include a device manager. For instance, in the example of FIG. 1A, the energy storage device 110A and the energy storage device 110B include, respectively, device managers 114A and 114B. For example, a device manager may include a battery management system (BMS) that is built into a smart battery pack.

In some embodiments, a device manager (e.g., the device manager 114A or the device manager 114B) may be configured to monitor one or more aspects of an associated energy storage (e.g., the energy storage 112A or the energy storage 112B). Examples of monitored aspects include, but are not limited to, current, voltage, temperature, state of charge (e.g., percentage charged), state of health (e.g., present capacity as percentage of original capacity when the energy storage device was new), etc. For instance, the device manager may include one or more sensors configured to collect data from the associated energy storage. Additionally, or alternatively, the device manager may include one or more controllers configured to process data collected from the associated energy storage.

In some embodiments, a device manager (e.g., the device manager 114A or the device manager 114B) may be configured to control an associated energy storage (e.g., the energy storage 112A or the energy storage 112B). For instance, the device manager may be configured to stop discharging of the associated energy storage in response to determining that a temperature of the associated energy storage has reached a selected threshold. Additionally, or alternatively, in an embodiment in which the associated energy storage includes a plurality of cells in series, the device manager may be configured to perform balancing, for example, by transferring energy from a most charged cell to a least charged cell.

In some embodiments, a device manager (e.g., the device manager 114A or the device manager 114B) may be configured to transmit data via a communication interface, such as a bus interface (e.g., Controller Area Network, or CAN), a wireless interface (e.g., Bluetooth), etc. For instance, the device manager may be configured to transmit data to a master controller 102 of the energy storage management system 100. Any suitable data may be transmitted, including, but not limited to, sensor data and/or one or more results of analyzing sensor data.

It should be appreciated that aspects of the present disclosure are not limited to using an energy storage device with an associated device manager. In some embodiments, one or more sensors external to an energy storage device may be used to monitor one or more aspects of the energy storage device, such as current, voltage, temperature, state of charge, state of health, etc.

In some embodiments, the master controller 102 may receive data from the energy application 120 in addition to, or instead of, the device manager 114A and/or the device manager 114B. For instance, the energy application 120 may provide data indicating how much power the energy application 120 is currently drawing or supplying. Additionally, or alternatively, the energy application 120 may provide environmental data such as weather (e.g., temperature, humidity, atmospheric pressure, etc.), traffic (in case of a vehicle), etc. Additionally, or alternatively, the energy application 120 may provide operational data such as speed (in case of a vehicle), CPU usage (in case of computing equipment), load weight (in case of a warehouse robot or a drone), etc.

Additionally, or alternatively, the master controller 102 may receive data from power electronics 104, which may include circuitry configured to distribute a demand or supply of power by the energy application 120 between the energy storage devices 110A and 110B. For instance, the power electronics 104 may provide data indicating whether the energy application 120 is currently drawing or supplying power, how much power the energy application 120 is currently drawing or supplying, and/or how that power is distributed between the energy storage devices 110A and 110B.

Additionally, or alternatively, the master controller 102 may receive data from one or more remote data sources 130. For example, the energy storage management system 100 may include a network interface 106 configured to establish a connection using a suitable networking technology (e.g., 5G, WiMax, LTE, GSM, WiFi, Ethernet, Bluetooth, etc.). Although only one network interface is shown in FIG. 1A, it should be appreciated that aspects of the present disclosure are not so limited. In some embodiments, a plurality of network interfaces may be provided, which may be of a same type or different types. In some embodiments, no network interface may be provided, and the master controller 102 may receive data from a remote data source via the energy application 120.

Moreover, it should be appreciated that data may be received from any suitable remote data source. For instance, the energy application 120 may be a vehicle in a fleet of vehicles, and the master controller 102 may receive data from other vehicles in the fleet. Additionally, or alternatively, the master controller 102 may receive data from a cloud server that is monitoring and/or controlling the fleet.

In some embodiments, the master controller 102 may be configured to provide one or more control signals to the power electronics 104. For instance, the master controller 102 may be configured to analyze data received from the energy storage device 110A, the energy storage device 110B, the power electronics 104, the energy application 120, and/or the one or more remote data sources 130. Based on a result of the analysis, the master controller 102 may determine how a demand (or supply) of power by the energy application 120 should be distributed between the energy storage devices 110A and 110B, and/or whether energy should be transferred from the energy storage device 110A to the energy storage device 110B, or vice versa. The master controller 102 may then provide one or more control signals to the power electronics 104 to effectuate the desired distribution of power and/or energy.

Although details of implementation are described above and shown in FIG. 1A, it should be appreciated that aspects of the present disclosure are not limited to any particular manner of implementation. For instance, while two energy storage devices (i.e., 110A and 110B) are shown in FIG. 1A, it should be appreciated that aspects of the present disclosure are not limited to using any particular number of one or more energy storage devices. In some embodiments, just one energy storage device may be used, or three, four, five, etc. energy storage devices may be used.

Figure 1B:
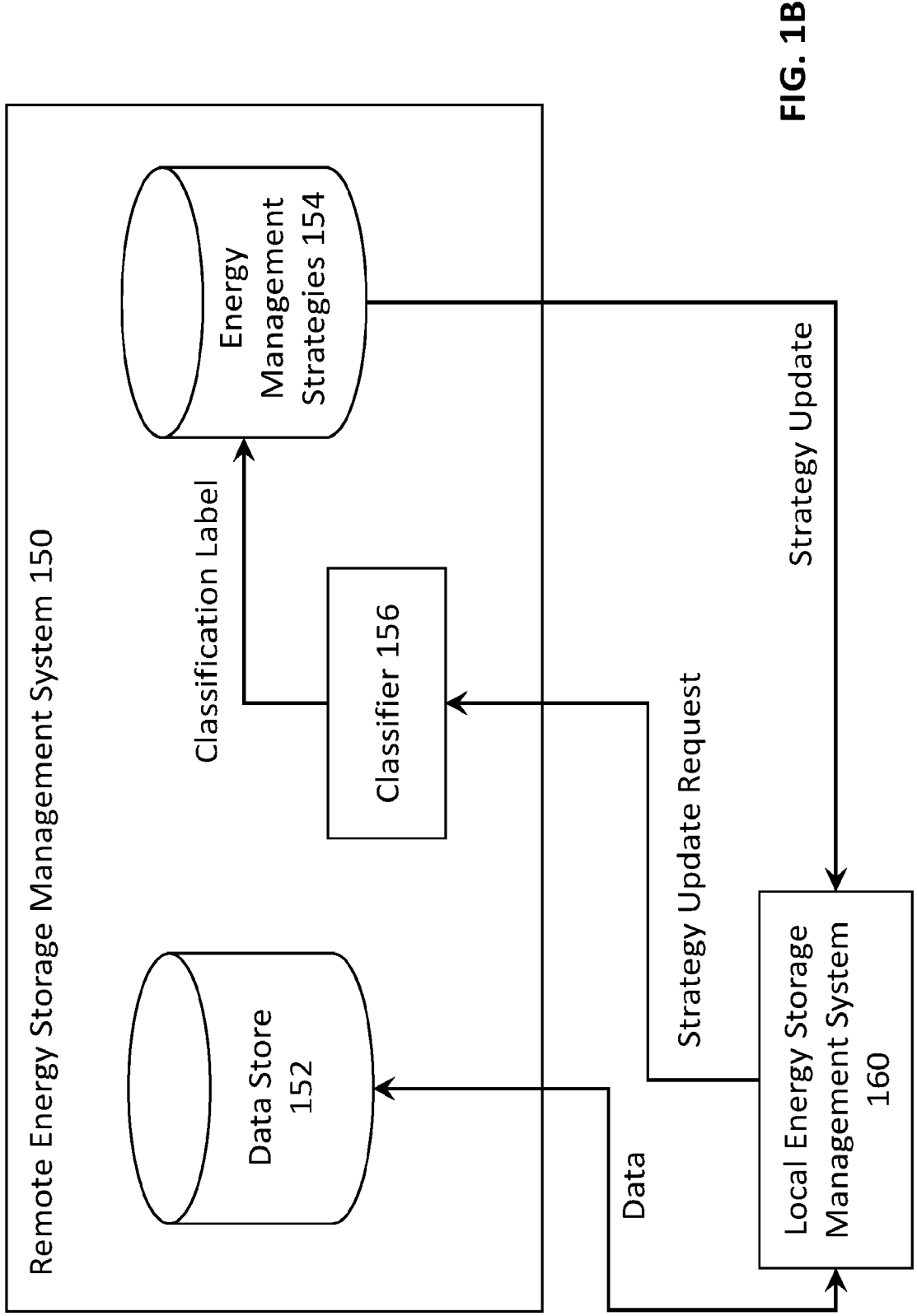
FIG. 1B shows an illustrative remote energy storage management system 150 and an illustrative local energy storage management system 160, in accordance with some embodiments.

FIG. 1B shows an illustrative remote energy storage management system 150 and an illustrative local energy storage management system 160, in accordance with some embodiments. For instance, the local energy storage management system 160 may include the illustrative energy storage management system 100 in the example of FIG. 1A, and may be co-located with the illustrative energy application 120. By contrast, the remote energy storage management system 150 may be located away from the energy application 120, and may communicate with the local energy storage management system 160 via one or more networks. For instance, the remote energy storage management system 150 may be located at a cloud server, and may communicate with one or more local energy storage management systems that are associated, respectively, with one or more energy applications (e.g., a fleet of electric vehicles).

The inventors have recognized and appreciated that a local energy storage management system may have one or more resource constraints, such as limited memory, limited processing cycles, etc. Accordingly, in some embodiments, the local energy storage management system 160 may transmit data to the remote energy storage management system 150 for storage and/or processing. For instance, the remote energy storage management system 150 may include a data store 152, which may store data received from the local energy storage management system 160 and/or one or more other local energy storage management systems. Accordingly, the local energy storage management system 160 may store a smaller amount of historical data, such as data collected from the energy application 120 over a shorter period of time (e.g., past hour, day, week, etc.), whereas the remote energy storage management system 150 may store a larger amount of historical data, such as data collected from the energy application 120 over a longer period of time (e.g., past month, quarter, year, etc.).

The inventors have further recognized and appreciated that a local energy storage management system may have access to limited data. For instance, the local energy storage management system 160 may have access only to data collected from the energy application 120. Accordingly, in some embodiments, the local energy storage management system 160 may receive data from the remote energy storage management system 150. Any suitable data may be received from the remote energy storage management system 150, including, but not limited to, traffic information, weather information, and/or information collected from one or more other energy applications.

The local energy storage management system 160 may transmit data to, and/or receive data from, the remote energy storage management system 150 in any suitable manner. In some embodiments, the local energy storage management system 160 may transmit data to, and/or receive data from, the remote energy storage management system 150 in real time. For instance, the local energy storage management system 160 may use one or more wired and/or wireless networking technologies to transmit data to, and/or receive data from, the remote energy storage management system 150 periodically (e.g., every second, minute, five minutes, 10 minutes, etc.). Additionally, or alternatively, the local energy storage management system 160 may transmit data to, and/or receive data from, the remote energy storage management system 150 in a batched fashion. For instance, the energy application 120 may include an electric vehicle, and the local energy storage management system 160 may transmit data to, and/or receive data from, the remote energy storage management system 150 when the energy application 120 is charging at a station.

In some embodiments, the local energy storage management system 160 may use one or more energy management strategies to analyze one or more inputs and output one or more control signals. The one or more energy management strategies may be selected dynamically. For instance, with reference to the example of FIG. 1A, an energy management strategy may be selected based on one or more conditions relating to the illustrative energy storage devices 110A-B and/or the illustrative energy application 120, and/or one or more environmental conditions.

Since the local energy storage management system 160 may have limited memory and/or processing cycles, the remote energy storage management system 150 may, in some embodiments, assist the local energy storage management system 160 in storing and/or selecting an appropriate energy management strategy. For instance, the remote energy storage management system 150 may store a collection of energy management strategies 154. Additionally, or alternatively, the remote energy storage management system 150 may include a classifier 156 configured to perform classification based on data received from the local energy storage management system 160.

In some embodiments, the local energy storage management system 160 may be configured to detect a change in one or more relevant conditions. As an example, the energy application 120 may include an electric vehicle, and the local energy storage management system 160 may be configured to detect a change in road conditions, for instance, by comparing one or more sensor measurements (e.g., slip coefficient, wheel vibration, etc.) against one or more respective thresholds. In response to detecting a change in road condition, the local energy storage management system 160 may send, to the remote energy storage management system 150, a request for an energy management strategy update.

In some embodiments, the strategy update request sent by the local energy storage management system 160 may include pertinent data, such as the one or more sensor measurements that triggered the strategy update request. The remote energy storage management system 150 may use this data to select an appropriate energy management strategy. For instance, the classifier 156 may include a machine learning model that maps two inputs, slip coefficient and wheel vibration, to a label indicative of a type of road condition (e.g., paving blocks, asphalt, concrete, dirt, etc.). The classifier 156 may apply such a machine learning model to the data received from the local energy storage management system 160. The remote energy storage management system 150 may use a label output by the classifier 156 to select an appropriate energy management strategy from the collection of energy management strategies 154. The remote energy storage management system 150 may then return the selected energy management strategy to the local energy storage management system 160.

Any suitable technique may be used to train a machine learning model for the classifier 156. For instance, in some embodiments, the machine learning model may include an artificial neural network. Labeled data (e.g., slip coefficient and wheel vibration measurements under known road conditions) may be used to train the artificial neural network. Additionally, or alternatively, an unsupervised learning technique (e.g., cluster analysis) may be used. However, it should be appreciated that aspects of the present disclosure are not limited to using a machine learning model to select an appropriate energy management strategy.

Although details of implementation are described above and shown in FIG. 1B, it should be appreciated that aspects of the present disclosure are not limited to any particular manner of implementation. For instance, in some embodiments, multiple classifiers may be provided (e.g., for road conditions, traffic, weather, etc.). Appropriate program logic may be applied to the outputs of these classifiers to select an energy management strategy. Additionally, or alternatively, a classifier may be provided at the local energy storage management system 160, and a classifier output may be sent to the remote energy storage management system 150 instead of, or in addition to, one or more raw measurements.

In some embodiments, the local energy storage management system 160 of the energy application 120 may share data with an energy storage management system of another energy application. For instance, the local energy storage management system 160 may receive data from, and/or send data to, the other energy storage management system through a communication channel established using one or more suitable networking technologies (e.g., 5G, WiMax, LTE, GSM, WiFi, Ethernet, Bluetooth, etc.).

In some embodiments, the local energy storage management system 160 may receive, from an energy storage management system of another energy application, data that may be used to evaluate system performance and/or predict future power demand. Examples of such data include, but are not limited to, current traffic conditions, cycle efficiencies, and/or states of health of energy storage devices. The local energy storage management system 160 may analyze the received data and decide whether to replace a currently deployed energy management strategy with another energy management strategy. For instance, the local energy storage management system 160 may determine that the other energy application is experiencing environmental conditions that is similar to what the energy application 120 is likely to experience in the near future (e.g., upcoming traffic conditions), and the other energy application is performing well in those environmental conditions (e.g., cycle efficiencies and/or states of health above respective thresholds). Accordingly, the local energy storage management system 160 may decide to switch to an energy management strategy applied by the other energy application.

It should be appreciated that the local energy storage management system 160 may communicate with the other energy storage management system either directly or indirectly. For instance, the energy storage management systems may establish a direct communication channel. Additionally, or alternatively, the energy storage management systems may communicate through one or more intermediaries, such as the remote energy storage management system 150 in the example of FIG. 1B. For instance, the remote energy storage management system 150 may collect data from multiple energy applications (e.g., a fleet of vehicles), determine which energy applications are performing well and which are performing poorly, and decide whether to instruct a poor-performing energy application to switch an energy management strategy used by a well-performing energy application.

It should also be appreciated that aspects of the present disclosure are not limited to having both a remote energy storage management system and a local energy storage management system. In some embodiments, there may be only a local energy storage management system, only a remote energy storage management system, or neither.

Figure 2A:
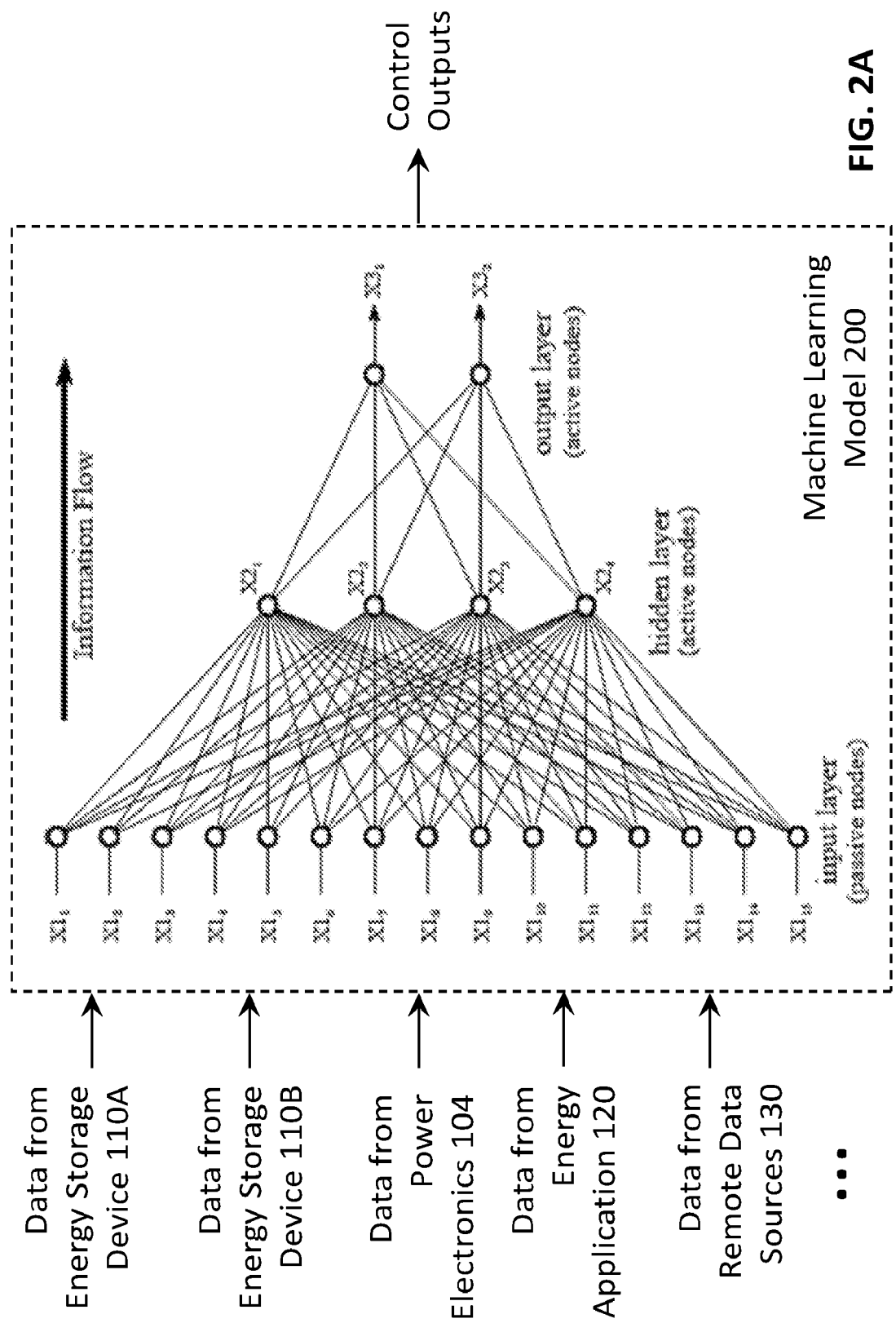
FIG. 2A shows an illustrative machine learning model 200, in accordance with some embodiments.

FIG. 2A shows an illustrative machine learning model 200, in accordance with some embodiments. The machine learning model 200 may be an energy management strategy that maps one or more inputs to one or more control outputs. (By contrast, the illustrative classifier 156 in the example of FIG. 1B may use a machine learning model that outputs one or more classification labels.)

In some embodiments, the machine learning model 200 may be part of the illustrative collection of energy management strategies 154 in the example of FIG. 1B. Additionally, or alternatively, the machine learning model 200 may be used by the illustrative master controller 102 in the example of FIG. 1A to analyze one or more inputs and output one or more control signals.

In some embodiments, the one or more inputs of the machine learning model 200 may include data from the illustrative energy storage device 110A, the illustrative energy storage device 110B, the illustrative power electronics 104, the illustrative energy application 120, and/or the one or more illustrative remote data sources 130 in the example of FIG. 1A. Such data may be received dynamically. The master controller 102 may use the machine learning model 200 to analyze the received data and provide one or more control signals accordingly. For instance, the master controller 102 may provide a control signal to the power electronics 104 to indicate how a demand or supply of power by the energy application 120 should be distributed between the energy storage devices 110A and 110B.

In some embodiments, the energy storage devices 110A and 110B may include one or more electrochemical battery packs, and the data received from the energy storage devices 110A and 110B may include one or more of the following. (The abbreviation "ESS" stands for energy storage system.)

TABLE 1

| Data for Electrochemical Battery | | | |
|---|---|---|---|
| Dependent Variable | Symbol | Independent Variables | Symbol |
| Energy Storage System State of Charge | $SoC_{ESS}$ | Voltage | $V_{ESS}$ |
| | | Operating Temperature | $T_{ESS}$ |
| | | Discharge/Charge Current | $I_{ESS}$ |

TABLE 1-continued

| Data for Electrochemical Battery | | | |
|---|---|---|---|
| Dependent Variable | Symbol | Independent Variables | Symbol |
| Equivalent Energy Storage System Series Resistance | $ESR_{ESS}$ | Discharge/Charge Current | $I_{ESS}$ |
| | | Operating Temperature | $T_{ESS}$ |
| | | Energy Storage System State of Health | $SoH_{ESS}$ |
| Energy Storage System State of Health Estimate | $SoH_{ESS}$ | Energy Storage System Maximum Nominal Capacity | $E_{ESS\_Nominal\_Max}$ |
| | | Energy Storage System Maximum Capacity[1] | $E_{ESS\_Max}$ |
| | | Energy Storage Average State of Charge | $SoC_{ESS\_Average}$ |
| | | Number of Equivalent Full Discharge Cycles | $N_{ESS}$ |
| | | Operating Temperature | $T_{ESS}$ |

[1] In some embodiments, maximum capacity for an energy storage device (e.g., battery, supercapacitor, etc.) may be modeled as a time-dependent function. For instance, maximum capacity may vary due to calendar aging, cyclical aging, etc. Additionally, or alternatively, a maximum capacity function may depend on one or more thermal conditions, one or more charge/discharge conditions, etc.

In some embodiments, the energy storage device 110B may include a supercapacitor, and the data received from the energy storage device 110B may include one or more of the following.

TABLE 2

| Data for Supercapacitor | | | |
|---|---|---|---|
| Dependent Variable | Symbol | Independent Variables | Symbol |
| State of Charge | $SoC_{ESS}$ | Voltage | $V_{ESS}$ |
| | | Operating Temperature | $T_{ESS}$ |
| | | Energy Storage System Capacitance | $C_{ESS}$ |
| | | Discharge/Charge Current | $I_{ESS}$ |
| Equivalent Energy Storage System Series Resistance | $ESR_{ESS}$ | Discharge/Charge Current | $I_{ESS}$ |
| | | Operating Temperature | $T_{ESS}$ |
| | | Energy Storage System State of Health | $SoH_{ESS}$ |
| Energy Storage System State of Health Estimate | $SoH_{ESS}$ | Energy Storage System Maximum Nominal Capacity | $E_{ESS\_Nominal\_Max}$ |
| | | Energy Storage System Maximum Capacity | $E_{ESS\_Max}$ |
| | | Energy Storage System Capacitance | $C_{ESS}$ |
| | | Energy Storage Average State of Charge | $SoC_{ESS\_Average}$ |
| | | Number of Equivalent Full Discharge Cycles | $N_{ESS}$ |
| | | Operating Temperature | $T_{ESS}$ |

In some embodiments, the data received from the power electronics 104, the energy application 120, and/or the one or more remote data sources 130 may include general environmental data, such as one or more of the following.

TABLE 3A

| General Environmental Data | | |
|---|---|---|
| Data | Symbol | Unit |
| Temperature | T | C. |
| Humidity | RH | % |
| Atmospheric Pressure | atm | Atm |
| Wind Speed and/or Direction | $V_{wind}$ | m/s |

In some embodiments, the energy application 120 may include a vehicle, and the data received from the power electronics 104, the energy application 120, and/or the one or more remote data sources 130 may include vehicle environmental data, such as one or more of the following.

TABLE 3B

| Vehicle Environmental Data | | |
|---|---|---|
| Dependent Variable | Category | Independent Variables |
| Vehicle Predicted Velocity Profile | Path Trajectory | GPS Coordinates Road Slope Speed Limit associated with Path Trajectory |
| | Sensor & Relational Data | Proximity to Co-Directional Vehicle(s) Velocity of Co-Directional Vehicle(s) Road Surface Classification |
| | Historical Data | Historical Path Trajectory Data associated with Active Path Trajectory |
| Vehicle Predicted Auxiliary Power Demand | Climate Control Energy Demand | Ambient Temperature of Operating Environment Absorption, Radiation and Transmission (ART) Ratio of Cabin[2] Geospatial Insolation Angle |
| | Energy Storage Active Thermal Management | Ambient Temperature |

[2] In some embodiments, ART ratio may be modeled as a time-dependent function. For instance, ART ratio may vary due to aging of cabin glass, changing weather, etc. Additionally, or alternatively, ART ratio may vary depending on time of day, time of year, etc. Accordingly, ART ratio may have large fluctuations throughout useful life of a vehicle, but may have small fluctuations within a single drive cycle.

In some embodiments, one or more of the dependent variables and/or independent variables shown in Table 3B may be used to predict vehicle power demand.

In some embodiments, the energy application 120 may include an electric grid, and the data received from the power electronics 104, the energy application 120, and/or the one or more remote data sources 130 may include electric grid environmental data, such as one or more of the following.

TABLE 3C

| Electric Grid Environmental Data | | |
|---|---|---|
| Dependent Variable | Category | Independent Variables |
| Power Generation Forecast | Weather | Wind Speed [m/s] Air Density [atm] Solar Radiation [kW/m$^2$] |

In some embodiments, one or more of the dependent variables and/or independent variables shown in Table 3C may be used to predict power generation (e.g., by wind turbines and/or solar panels) and/or power demand.

In some embodiments, the data received from the power electronics 104, the energy application 120, and/or the one or more remote data sources 130 may include general operational data, such as one or more of the following.

TABLE 4A

| General Operational Data | | |
|---|---|---|
| Data | Symbol | Unit |
| Power | P | kW |
| Current | i | Ampere |
| Energy efficiency | η | N/A |

In some embodiments, the energy application 120 may include a vehicle, and the data received from the power electronics 104, the energy application 120, and/or the one or more remote data sources 130 may include vehicle operational data, such as one or more of the following.

TABLE 4B

| Vehicle Operational Data | | |
|---|---|---|
| Dependent Variable | Category | Independent Variables |
| Vehicle Predicted Velocity Profile | Pilot Data | Torque Demand Brake Position Sensor Data |
| | Historical Data | Historical Pilot Data associated with Active Path Trajectory |
| | Vehicle Kinematics | Total Vehicle Chassis and Passenger/Payload Mass Road Load Coefficients ($F_0$, $F_1$, $F_2$) Powertrain Efficiency Regenerative Braking Efficiency Power Electronics Efficiency |
| Vehicle Predicted Auxiliary Power Demand | Climate Control Energy Demand | Driver Requested Temperature Driver Requested Fan Speed Cabin Window Position Sensor Data Driver Requested Airflow Channel |
| | Transmission & Powertrain Fluid Pump Demand | Transmission Rotational Velocity Transmission Oil Viscosity Transmission Oil Temperature Spin Loss |
| | Vehicle Operational Losses | Brake-by-wire system power demand Steer-by-wire system power demand |
| | Energy Storage Active Thermal Management | Energy Storage System Heat Generation Energy Storage System Operating Temperature Range Energy Storage System Measured Temperature |

In some embodiments, one or more of the dependent variables and/or independent variables shown in Table 4B may be used to predict vehicle power demand.

In some embodiments, the energy application 120 may include an electric grid, and the data received from the power electronics 104, the energy application 120, and/or the one or more remote data sources 130 may include electric grid operational data, such as one or more of the following.

TABLE 4C

Electric Grid Operational Data

| Dependent Variable | Category | Independent Variables |
|---|---|---|
| Power Generation Forecast | General | Generation Type (e.g., Photovoltaic, Wind, etc.) System Capacity Power Electronics Losses Transmission & Wiring Losses |
| | Photovoltaic | Photovoltaic Panel Efficiency Array Azimuth [°] Array Tilt [°] |
| | Wind | Betz Limit [ ] Blade Radius [m] Tip Speed Ratio [ ] |
| Power Demand Forecast | Sensor & Historical Data | Forecast by Independent System Operator (ISO) or other Organization Instantaneous Power Demand Historical Power Demand |

In some embodiments, one or more of the dependent variables and/or independent variables shown in Table 3C may be used to predict power generation (e.g., by wind turbines and/or solar panels) and/or power demand.

It should be appreciated that the above examples of dynamic data are provided solely for purposes of illustration, as aspects of the present disclosure are not limited to using any particular type or combination of dynamic data, or any dynamic data at all. For instance, although vehicle and electric grid are discussed above, it should be appreciated that the techniques described herein may be used to manage energy storage systems for any type of energy application.

As described above in connection with the example of FIG. 1A, the master controller 102 may provide one or more control signals indicative of a power distribution. For instance, the one or more control signals may indicate a percentage of power to be drawn from, or supplied to, the energy storage device 110A, and/or a percentage of power to be drawn from, or supplied to, the energy storage device 110B. In some embodiments, this power distribution may be effectuated by the power electronics 104 during a next control cycle. Additionally, or alternatively, power distribution may be updated one or more times during a control cycle.

In some instances, power may be drawn from both the energy storage device 110A and the energy storage device 110B, and the one or more control signals may indicate how an overall power demand is split between these two energy storage devices. In some instances, power may be supplied to both the energy storage device 110A and the energy storage device 110B, and the one or more control signals may indicate how an overall power supply is split between these two energy storage devices.

In some embodiments, the master controller 102 may sometimes output a power distribution where a first amount of power is to be drawn from the energy storage device 110A, but a second amount of power is to be supplied to the energy storage device 110B. Additionally, or alternatively, the master controller 102 may sometimes output a power distribution where a first amount of power is to be supplied to the energy storage device 110A, but a second amount of power is to be drawn from the energy storage device 110B. A difference between the first amount and the second amount may indicate an amount of power drawn from, or supplied to, the energy application 120. If the energy application 120 is drawing power, the one or more control signals may indicate how an amount of power drawn from one energy storage device is split between the energy application 120 and the other energy storage device. If the energy application 120 is supplying power, the one or more control signals may indicate how an amount of power supplied to one energy storage device is split between the energy application 120 and the other energy storage device.

The inventors have recognized and appreciated that it may be desirable to provide updates in power distribution based on newly collected data. For instance, power distribution may be updated based on one or more objectives, such as improving lifetime of energy storage devices, improving energy efficiency (e.g., extending range of an electric vehicle), etc. Therefore, shorter control cycles may be beneficial. However, control cycles that are too short may lead to rapid power fluctuations, which may in turn cause damage to power electronics, electric motors, etc. Accordingly, in some embodiments, a duration of a control cycle may be selected that represents a desired tradeoff. For instance, a control cycle may last several seconds (e.g., 5 seconds, 10 seconds, 20 seconds, 30 seconds, 40 seconds, 50 seconds, 60 seconds, . . . ) or several minutes (e.g., 2 minutes, 3 minutes, 4 minutes, 5 minutes, 6 minutes, 7 minutes, 8 minutes, 9 minutes, 10 minutes, . . . ).

In some embodiments, data that is used by the master controller 102 to make control decisions may be acquired at a frequency that is the same as, or different from, a frequency at which power distribution is updated. For instance, a data acquisition frequency (e.g., every millisecond) may be a multiple of a power distribution update frequency (e.g., every second), so that multiple data points may be collected during a control cycle. A suitable statistic (e.g., mean, median, mode, maximum, minimum, etc.) of the data points may be used to determine an appropriate power distribution to be effectuated during a next control cycle.

In some embodiments, one or more machine learning techniques may be used to determine an appropriate power distribution. For instance, the machine learning model in the example of FIG. 2A may include an artificial neural network with an input layer, one or more hidden layers, and an output layer. In some embodiments, the artificial neural network may be a multilayer perceptron network, although that is not required. Aspects of the present disclosure are not limited to using any particular type of artificial neural network, or any artificial neural network at all. For instance, in some embodiments, a convolutional neural network may be used, with one or more convolutional layers and/or pooling layers for feature learning, followed by one or more fully-connected layers for classification.

The inventors have recognized and appreciated that, in some instances, it may be beneficial to use a set of machine learning models, as opposed to a single machine learning model. For instance, a machine learning model with a large number of input nodes may be replaced by a set of machine learning models each having a small number of input nodes. These machine learning models may be trained separately, thereby reducing computation complexity.

Figure 2B:
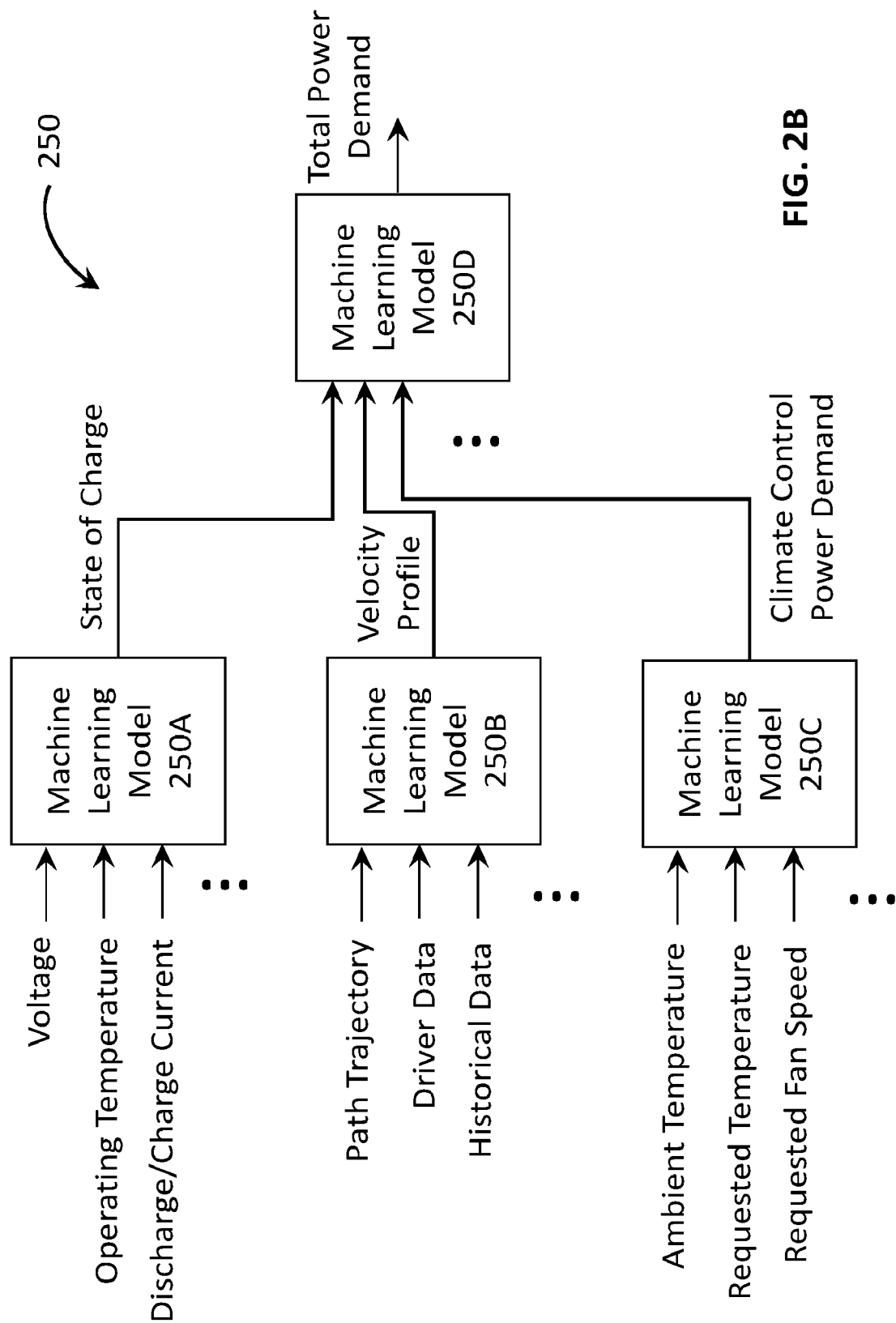
FIG. 2B shows an illustrative set of machine learning models 250, in accordance with some embodiments.

FIG. 2B shows an illustrative set of machine learning models 250, in accordance with some embodiments. For instance, machine learning models 250A, 250B, 250C, 250D, etc., collectively, may be used by the illustrative master controller 102 in the example of FIG. 1A to map one or more inputs to one or more control outputs.

In some embodiments, the machine learning models 250A, 250B, 250C, 250D, etc. may be connected in a suitable manner. For instance, the machine learning model 250D may be adapted to generate an output based on a plurality of inputs, where some of the inputs are output by the machine learning models 250A, 250B, and 250C. Thus, some of the models (e.g., 250A and 250D) may be in series, while others (e.g., 250A, 250B, and 250C) may be in parallel.

In the example shown in FIG. 2B, the machine learning model 250D may be adapted to estimate a total power demand by an electric vehicle. The machine learning model 250D may receive current conditions of one or more energy storage devices in the electric vehicle, kinetic characteristics of the electric vehicle, expected velocity profile of the electric vehicle, expected power loses in one or more auxiliary systems, and/or one or more other inputs. For instance, the machine learning model 250D may receive, from the machine learning model 250A, an estimated state of charge for one of the energy storage devices. The machine learning model 250A may in turn receive voltage, operating temperature, discharge/charge current, and/or one or more other inputs.

Additionally, or alternatively, the machine learning model 250D may receive, from the machine learning model 250B, an expected velocity profile for electrical vehicle. The machine learning model 250B may in turn receive path trajectory, driver data, historical data, and/or one or more other inputs.

Additionally, or alternatively, the machine learning model 250D may receive, from the machine learning model 250C, an expected power demand for a climate control auxiliary system. The machine learning model 250C may in turn receive ambient temperature, requested temperature, requested fan speed, and/or one or more other inputs.

It should be appreciated that the various inputs and outputs described above and shown in FIG. 2B are provided solely for purposes of illustration. Aspects of the present disclosure are not limited to using a machine learning model with any particular input or combination of inputs, or any particular output or combination of outputs. Aspects of the present disclosure are also not limited to using a set of machine learning models arranged in any particular manner, or any machine learning model at all.

In some embodiments, each of the machine learning models 250A, 250B, 250C, 250D, etc. may include an artificial neural network, or a model of some other type. For instance, power demand for a climate control auxiliary system (e.g., driver cabin HVAC) may vary stochastically depending on time of day, weather, number of occupants, driver desired temperature, etc. Accordingly, the machine learning model 250C may include an artificial neural network adapted to estimate the power demand based on, for example, one or more of the following inputs.

Driver requested temperature
Driver requested fan speed
Driver requested air channel flow (e.g., whether to have air circulated within the cabin only, or to allow fresh air from outside)
Driver requested seat and/or steering wheel heating
Number of occupants
Ambient temperature
Heat input to cabin due to solar radiation
Cabin HVAC usage history (e.g., all of the above inputs and corresponding output) for a same time of day for a same range of driver requested temperature.

In some embodiments, a fully-connected neural network may be used to determine a cabin HVAC power demand based on one or more of the above inputs and/or one or more other inputs. The neural network may have an input layer with any suitable number of nodes. For instance, there may be one input node for each of the above inputs, or there may be more or fewer input nodes.

In some embodiments, the neural network may have at least one hidden layer. Such a hidden layer may have as many nodes as the input layer, or fewer nodes, depending on desired levels of accuracy, computation efficiency, etc.

Any suitable type of activation function may be used for the neural network, including, but not limited to, sigmoid, rectified linear unit (ReLU), etc. The activation function may be selected in any suitable manner, for example, depending on a depth of the neural network.

In some embodiments, the neural network may have an output node for cabin HVAC power demand. Additionally, or alternatively, the output node may include other information (e.g., cabin temperature to be attained, rate of change of cabin temperature, etc.). Such information may be provided for monitoring and/or feedback.

In some embodiments, a long short-term memory (LSTM) neural network may be used instead of, or in addition to, a feedforward neural network. One or more outputs of the LSTM neural network (e.g., cabin HVAC power demand, cabin temperature to be attained, rate of change of cabin temperature, etc.) may be fed back into the LSTM neural network to establish a time series of recent history, which may improve forecasting accuracy.

It should be appreciated that one or more of the neural network techniques described above, and/or one or more other neural network techniques, may be used to estimate any suitable dependent variable in addition to, or instead of cabin HVAC power demand. For instance, one or more of the neural network techniques described above, and/or one or more other neural network techniques, may be used to estimate velocity profile, energy storage operating temperature, energy storage state of charge, etc. Additionally, or alternatively, one or more of the neural network techniques described above, and/or one or more other neural network techniques, may be used to determine a power distribution among multiple energy storage devices (e.g., the illustrative energy storage devices 110A-B in the example of FIG. 1A).

In some embodiments, a neural network may be trained using labeled data. Such labeled data may be created for a given neural network by collecting data through testing and/or simulation, and annotating the collected data. With respect to the example in FIG. 2B, training data for the machine learning model 250B may be labeled based on velocity ranges (e.g., "10-15 mph," "15-20 mph," etc. for each road segment in a route).

The inventors have recognized and appreciated that certain limits (e.g., maximum instantaneous charge/discharge current, max/min operating temperature, etc.), if exceeded, may cause damage to an energy storage system. Accordingly, in some embodiments, program logic may be provided to analyze an output of a neural network. For example, if a neural network outputs a discharge current for an energy storage device that exceeds a maximum instantaneous discharge current for that device, that output may not be fed into another component of an energy storage management system (e.g., another neural network). Additionally, or alternatively, the output may be flagged as impossible and/or replaced by the maximum instantaneous discharge current.

In some embodiments, weights and/or biases of a neural network may be trained initially using data from testing and/or simulation. For instance, weights and/or biases for a neural network for estimating a dependent variable relating to an energy storage device may be trained on data obtained from experiments conducted on the energy storage device and/or computer simulations that apply relevant load profiles to models of the energy storage device. After such initial training, the neural network may be deployed to analyze data obtained during operation of an energy application. Estimates output by the neural network may be compared against measurements to identify differences. The differences, if any, may be used to continue to train the neural network.

It should be appreciated that any one or more suitable methods may be used to train a neural network, as aspects of the present disclosure are not so limited. Examples of training methods include, but are not limited to, gradient descent, Newton, conjugate gradient, quasi-Newton, and/or Levenberg-Marquardt.

The inventors have recognized and appreciated that, in some instances, training data relevant for a particular deployment scenario may be initially be unavailable. As one example, labeled data may not be available for a new Li-NMC battery. Nevertheless, a neural network for estimating state of charge may be trained on available labeled data for a Li-NCA battery, and may be deployed for the Li-NMC battery. Additional training may be performed as labeled data for the Li-NMC battery becomes available. For instance, state of charge may be measured as the Li-NMC battery is used, and the measured state of charge (along with corresponding inputs) may be used for additional training.

As another example, labeled data from actual drive cycles may not be available for a new vehicle. Nevertheless, a neural network for estimating velocity profile may be trained on available labeled data from standard emission testing (e.g., US EPA FTP-75 urban and highway combined drive cycle). For instance, a neural network may be trained to predict a velocity for a next time point given a velocity profile over one or more previous time points. Any suitable granularity of time may be used, such as every sec, every 5 sec, every 10 sec, etc.

In some embodiments, additional training may be performed as labeled data from actual drive cycles becomes available. For instance, a velocity profile may be recorded as the vehicle is driven, and the recorded velocity profile (along with corresponding inputs) may be used for additional training.

Although an electric vehicle is described above in connection with the example of FIG. 2B, it should be appreciated that aspects of the present disclosure are not limited to any particular type of energy application. In some embodiments, a machine learning model may be provided to estimate a computation profile for a data center, which may in turn be used to estimate the data center's total power demand.

In some embodiments, a route planning service (e.g., Google Maps, Apple Maps, etc.) may be used to determine a route to be traveled by an electric vehicle from a starting point to a destination. For instance, the starting point may be a current position obtained from a GPS device onboard the vehicle, whereas the destination may be received from a driver via the vehicle's infotainment system.

In some embodiments, a route may include a sequence of one or more road segments, where the end of a non-final segment may be connected to the beginning of a following segment. For instance, the non-final segment may end at a same intersection where the next segment starts.

In some embodiments, a route planning service may provide regulatory information for a road segment, such as locations of speed limits, traffic signs, traffic signals, etc. Additionally, or alternatively, the route planning service may provide current and/or historical traffic information for the road segment, such as average traffic speed for a given time of day, actual traffic speed, expected travel time, etc. Additionally, or alternatively, the route planning service may provide geospatial information for the road segment, such as longitude, latitude, elevation, and/or curvature information for one or more points along the road segment. However, it should be appreciated that aspects of the present disclosure are not limited to receiving any particular information, or any information at all, from a route planning service.

In some embodiments, one or more road segments provided by a route planning service may be re-segmented. For instance, if a road segment provided by the route planning service includes a change in speed limit (or a traffic signal), the road segment may be broken into two segments at a point where the change in speed limit occurs (or where the traffic signal is located).

Additionally, or alternatively, if a road segment provided by the route planning service includes a traffic sign that suggests the vehicle should slow down or stop (e.g., sharp turn, merging traffic, blind driveway, pedestrian crossing, etc.), the road segment may be broken into two or more segments. For example, there may be a first segment ending at the traffic sign, a second segment following the first segment and ending where a condition indicated by the traffic sign ends, and a third segment following the second segment.

The inventors have recognized and appreciated that re-segmenting a road segment may facilitate more accurate predictions of velocity profiles. However, it should be appreciated that aspects of the present disclosure are not limited to re-segmenting a road segment in any particular manner, or at all.

The inventors have further recognized and appreciated that different drivers may behave differently, especially when transitioning between road segments. Such differences may, in some embodiments, be taken into account when predicting velocity profiles.

FIG. 3A shows illustrative velocity profiles 300A and 305A, in accordance with some embodiments. The velocity profile 300A may correspond to an aggressive driver, whereas the velocity profile 305A may correspond to a conservative driver.

In this example, both drivers may be traveling on a road segment with a speed limit of 30 mph, and may approach a next road segment with a speed limit of 45 mph. Both drivers may observe a sign indicating the new speed limit of 45 mph, and may begin accelerating at about the same time. The conservative driver may have an acceleration $a_1$, whereas the aggressive driver may have an acceleration $a_2$, which is great than $a_1$. As a result, the aggressive driver may reach a velocity of 45 mph before the conservative driver.

Accordingly, the velocity profile 300A of the aggressive driver may be obtained from the velocity profile 305A of the conservative driver by making a steeper incline (i.e., greater acceleration). Thus, for the acceleration phase, the velocity profile 300A of the aggressive driver may be $$v_2(t) = 30 + \frac{a_2}{a_1} v_1(t),$$

where $v_i(t)$ is the velocity profile 305A of the conservative driver.

Figure 3B:
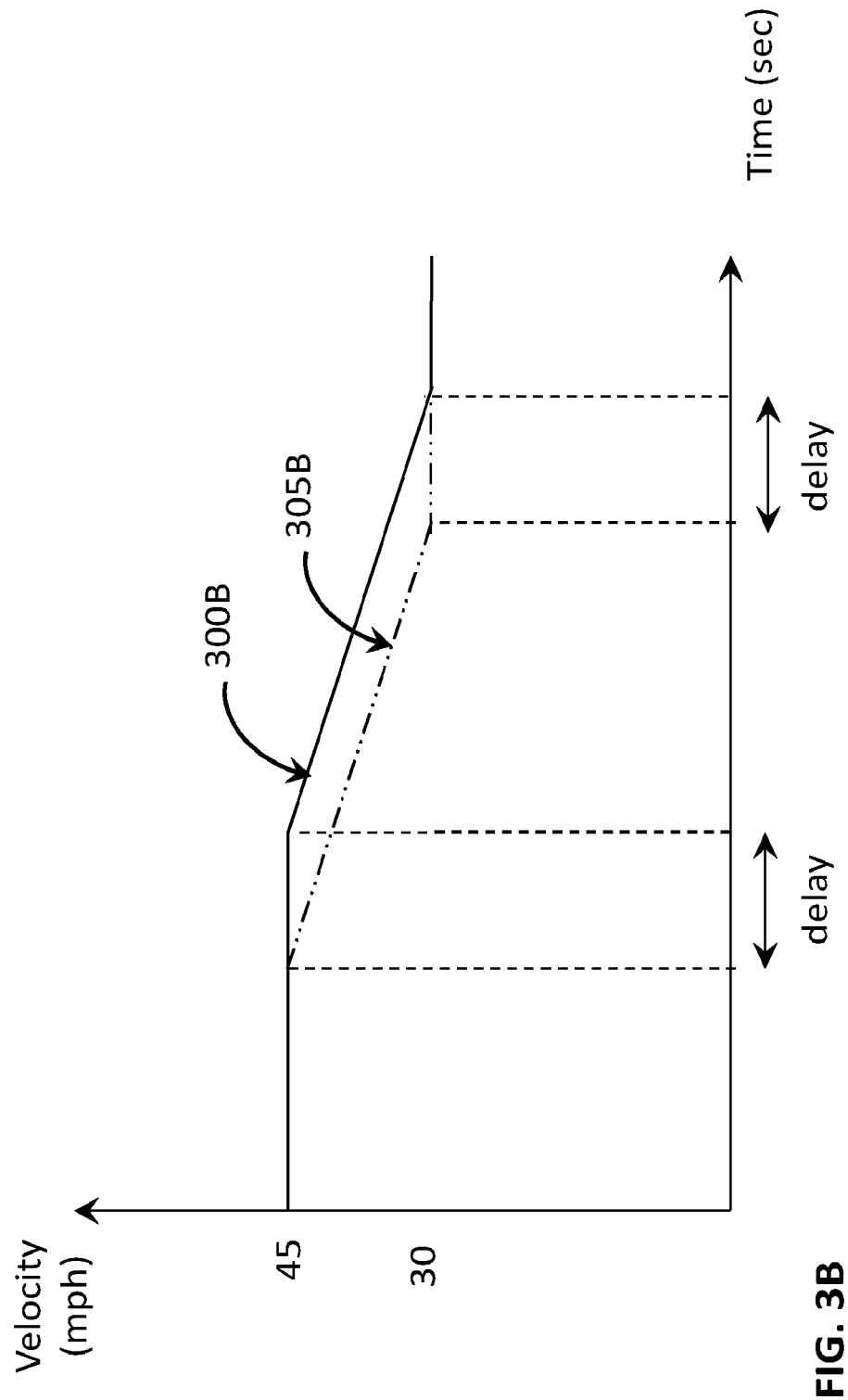
FIG. 3B shows illustrative velocity profiles 300B and 305B, in accordance with some embodiments.

FIG. 3B shows illustrative velocity profiles 300B and 305B, in accordance with some embodiments. The velocity profile 300B may correspond to a sloppy driver, whereas the velocity profile 305B may correspond to a careful driver.

In this example, both drivers may be traveling on a road segment with a speed limit of 45 mph, and may approach a next road segment with a speed limit of 30 mph. Both drivers may observe, at about the same time, a sign indicating the new speed limit of 30 mph. The careful driver may immediately begin cruising, whereas the sloppy driver may maintain the previous velocity (45 mph) for a longer period of time.

Accordingly, the velocity profile 300B of the sloppy driver may be obtained by shifting the velocity profile 305B of the careful driver to the right according to a delay in the sloppy driver's reaction. Thus, for the deceleration phase, the velocity profile 300B of the sloppy driver may be $v_2(t)=v_1(t-\text{delay})$, where $v_1(t)$ is the velocity profile 305B of the careful driver.

Figure 3C:
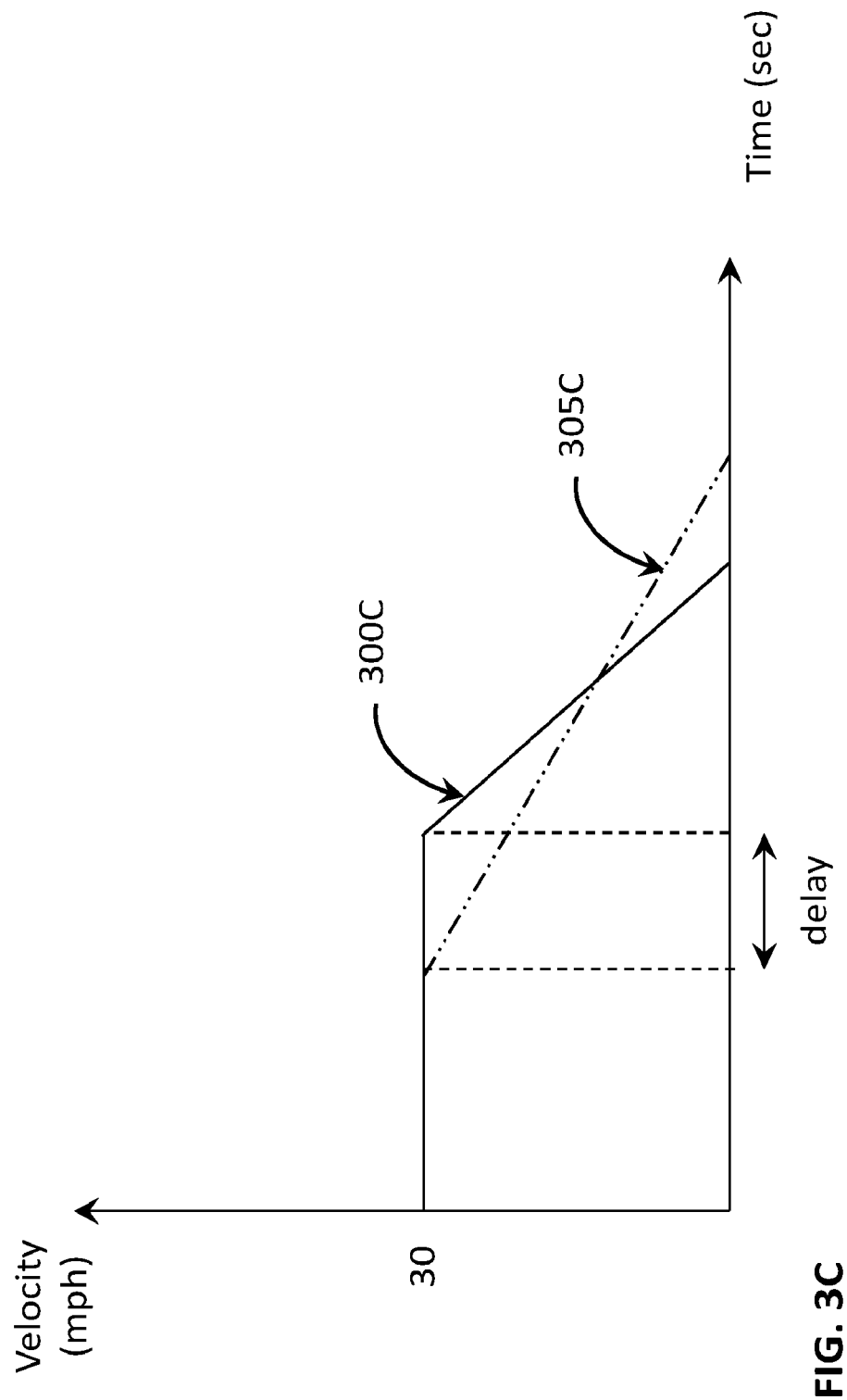
FIG. 3C shows illustrative velocity profiles 300C and 305C, in accordance with some embodiments.

FIG. 3C shows illustrative velocity profiles 300C and 305C, in accordance with some embodiments. The velocity profile 300C may correspond to a sloppy driver, whereas the velocity profile 305C may correspond to a careful driver.

In this example, both drivers may be traveling on a road segment with a speed limit of 30 mph, and may approach an intersection with a traffic signal. Both drivers may observe a red light at about the same time. The careful driver may immediately begin braking, whereas the sloppy driver may begin braking after a certain delay. As a result, the careful driver may be able to brake more gradually, whereas the sloppy driver may have to brake more sharply.

Accordingly, the velocity profile 300C of the sloppy driver may be obtained by shifting the velocity profile 305C of the careful driver to the right according to a delay in the sloppy driver's reaction, and then making a steeper decline (i.e., greater deceleration). Thus, for the deceleration phase, the velocity profile 300C of the sloppy driver may be $$v_2(t) = 30 - \frac{a_2}{a_1}(30 - v_1(t - \text{delay})),$$

where $v_1(t)$ is the velocity profile 305C of the careful driver, $a_2$ is the deceleration of the sloppy driver, and $a_1$ is the deceleration of the careful driver.

Figure 3D:
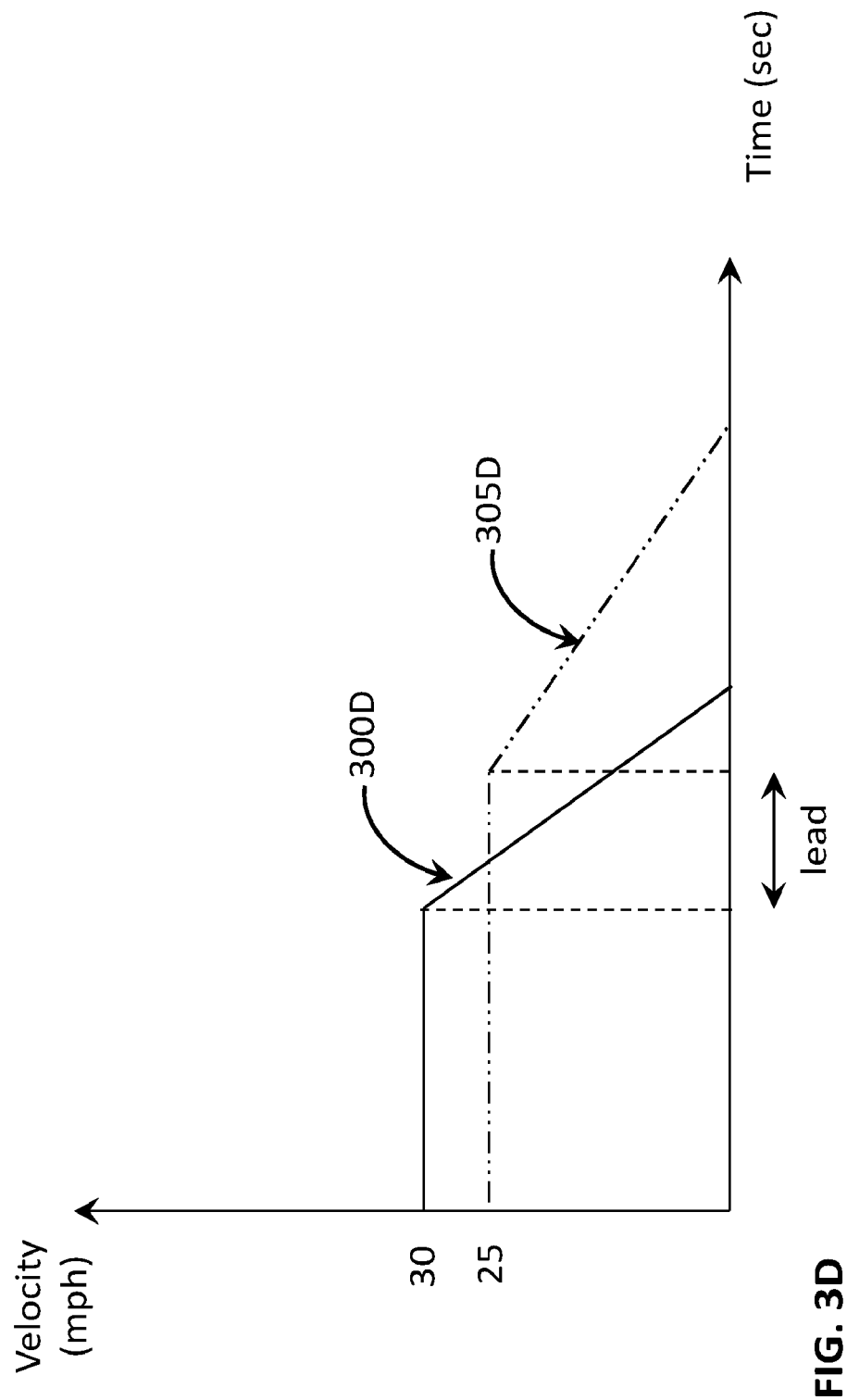
FIG. 3D shows illustrative velocity profiles 300D and 305D, in accordance with some embodiments.

FIG. 3D shows illustrative velocity profiles 300D and 305D, in accordance with some embodiments. The velocity profile 300D may correspond to an aggressive driver, whereas the velocity profile 305D may correspond to a conservative driver.

In this example, both drivers may be traveling on a road segment with a speed limit of 25 mph, and may approach an intersection with a traffic signal. Suppose the traffic signal is red, and is first visible from a point P. The conservative driver may travel at the speed limit (i.e., 25 mph), whereas the aggressive driver may travel at 1.2 times the speed limit (i.e., 30 mph). Because the aggressive driver is going faster, the aggressive driver may reach the point P before the conservative driver. Assuming both drivers begin braking at the point P, the aggressive driver may have to brake more sharply than the conservative driver, because the aggressive driver is coming to a stop from a higher velocity.

Accordingly, the velocity profile 300D of the aggressive driver may be obtained by shifting the velocity profile 305D of the conservative driver to the left, and then making a steeper decline (i.e., greater deceleration). The left shift may correspond to the aggressive driver's lead over the conservative driver in reaching the point P. Thus, for the deceleration phase, the velocity profile 300D of the aggressive driver may be $$v_2(t) = 30 - \frac{a_2}{a_1}(25 - v_1(t + \text{lead})),$$

where $v_1(t)$ is the velocity profile 305A of the conservative driver, $a_2$ is the deceleration of the aggressive driver, and $a_1$ is the deceleration of the conservative driver.

Although various modeling approaches are shown in FIGS. 3A-D and described above, it should be appreciated that aspects of the present disclosure are not limited to using any particular approach to model sloppy/aggressive vs. careful/conservative driving, or to modeling such differences at all.

Figure 4A:
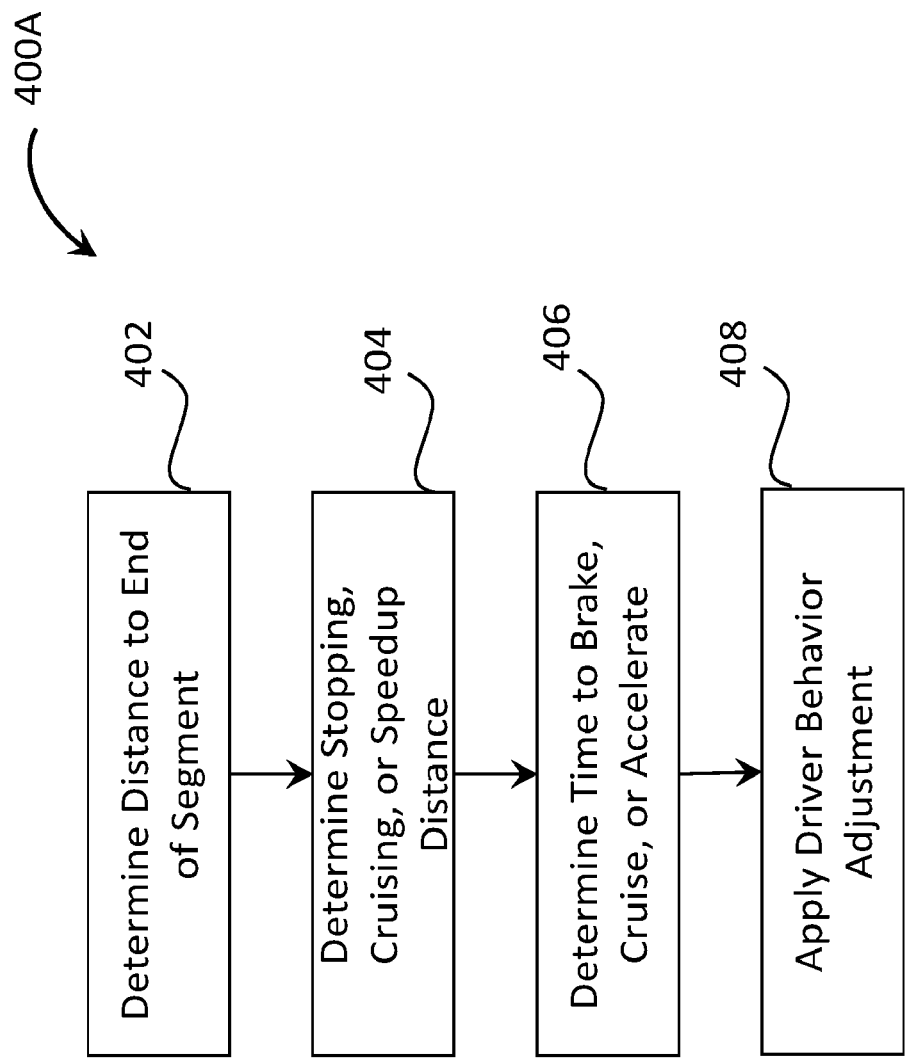
FIG. 4A shows an illustrative process 400A for end-of-segment velocity prediction, in accordance with some embodiments.

FIG. 4A shows an illustrative process 400A for end-of-segment velocity prediction, in accordance with some embodiments. In this example, a velocity profile may be determined for a vehicle traveling from a current position on a road segment to an end of the road segment. The current position may be a starting point of the road segment, or some intermediate point.

At act 402, a distance to the end of the road segment may be determined. This may be done in any suitable manner, for example, based on geospatial data for the current position and geospatial data for the end of the road segment. In some embodiments, the geospatial data for the current position may be obtained from a GPS device onboard the vehicle, while the geospatial data for the end of the road segment may be obtained from a route planning service.

At act 404, it may be determined whether the end of the road segment involves a sharp turn, a stop sign, a traffic signal, or some other condition that indicates it may be desirable to plan for a stop. If such a condition is present, a stopping distance may be determined, for example, based on a default velocity (e.g., a speed limit) for the road segment and a deceleration value for braking. In some embodiments, the deceleration value for braking may be determined based on one or more inputs such as an indication of load weight (e.g., number of passengers), road gradient, road condition (e.g., paving blocks, asphalt, concrete, dirt, etc.), weather condition (e.g., humidity, temperature, etc.), current velocity, target velocity, etc. For instance, the deceleration value may be retrieved from a lookup table using the one or more inputs.

Additionally, or alternatively, the deceleration value for braking may be predicted by providing the one or more inputs to a machine learning model that has been trained using historical braking profiles. For instance, a velocity profile may be tagged as a braking profile if the velocity profile is recorded when a brake pedal is pushed. Such a braking profile may be further tagged with information such as load weight, road gradient, road condition, weather condition, current velocity, target velocity, etc. The tagged braking profiles may be segmented by driver, and may be used to train a driver-specific machine learning model for predicting, based on one or more input tags, a deceleration value for braking.

Additionally, or alternatively, a maximum deceleration value for braking may be chosen based on one or more considerations such as comfort and/or safety. Such a maximum may be used to cap the deceleration value used to determine the stopping distance.

In some embodiments, it may be determined whether a condition is present that indicates it may be desirable to plan for a slowdown. For instance, it may be determined whether a next road segment has a reduced default velocity (e.g., a lower speed limit) compared to the current road segment. If such a condition is present, a cruising distance may be determined, for example, based on a difference between the default velocity of the current road segment and the default velocity of the next road segment, as well as a deceleration value for cruising.

The deceleration value for cruising may be determined in a manner that is similar to how the deceleration value for braking is determined. For instance, the deceleration value for cruising may be determined by accessing a lookup table, using a machine learning model, capping at a maximum deceleration value, etc. In some embodiments, a machine learning model may be trained using historical cruising profiles. For instance, a velocity profile may be tagged as a cruising profile if the velocity profile is recorded when no pedal is pushed. Such cruising profiles may be tagged and/or segmented as described above for braking profiles.

In some embodiments, it may be determined whether a condition is present that indicates it may be desirable to plan for a speedup. For instance, it may be determined whether a next road segment has an increased default velocity (e.g., a higher speed limit) compared to the current road segment. If such a condition is present, a speedup distance may be determined, for example, based on a difference between the default velocity of the next road segment and the default velocity of the current road segment, as well as an acceleration value.

The acceleration value may be determined in a manner that is similar to how the deceleration value for braking is determined. For instance, the acceleration value may be determined by accessing a lookup table, using a machine learning model, capping at a maximum acceleration value, etc. In some embodiments, a machine learning model may be trained using historical accelerating profiles. For instance, a velocity profile may be tagged as an accelerating profile if the velocity profile is recorded when an acceleration pedal is pushed. Such accelerating profiles may be tagged and/or segmented as described above for braking profiles.

It should be appreciated that aspects of the present disclosure are not limited to determining a stopping distance, a cruising distance, or a speedup distance in any particular manner, or at all.

Referring again to FIG. 4A, a time to brake, cruise, or accelerate may be determined at act 406. For instance, if it is determined at act 404 that stopping is appropriate at the end of the current road segment, the stopping distance determined at act 404 may be subtracted from the remaining distance determined at act 402 to determine a distance for which the vehicle is assumed to be traveling at the default velocity (e.g., the speed limit) for the current road segment. This distance may then be divided by the default velocity to determine a time at which braking should begin.

The inventors have recognized and appreciated that, in some instances, the stopping distance determined at act 404 may be greater than the remaining distance determined at act 402. Accordingly, it may be determined that braking should begin immediately. The deceleration value for braking, as determined at act 404, may be used to determine an end-of-segment velocity, which may in turn be used as a current velocity for a next segment. Additionally, or alternatively, braking may continue into the next segment until the vehicle comes to a full stop.

In some embodiments, if it is determined at act 404 that cruising (or speedup) is appropriate at the end of the current road segment, the cruising (or speedup) distance determined at act 404 may be subtracted from the remaining distance determined at act 402 to determine a distance for which the vehicle is assumed to be traveling at the default velocity (e.g., the speed limit) for the current road segment. This distance may then be divided by the default velocity (e.g., the speed limit) to determine a time at which cruising should begin.

The inventors have recognized and appreciated that, in some instances, the cruising distance determined at act 404 may be greater than the remaining distance determined at act 402. Accordingly, it may be determined that cruising should begin immediately. Additionally, or alternatively, it may be determined that braking should begin immediately, followed by cruising, or vice versa.

In some embodiments, a machine learning model may be used to predict a pattern of braking and/or cruising. For instance, the machine learning model may output one or more multipliers, such as a multiplier to adjust for sloppiness (e.g., braking later), a multiplier to adjust for aggressiveness (e.g., braking more sharply), etc. Such a machine learning model may be trained using historical velocity profiles segmented by driver, and may have any suitable input(s), such as one or more of the following.

- One or more suitable statistics on acceleration and/or deceleration values, such as one or more histograms, one or more statistics that measure central tendency, one or more statistics that measure dispersion, etc.
- Last N acceleration values and/or deceleration values observed in driving scenarios matching a current driving scenario
- Energy storage system state of charge
- Energy storage system maximum instantaneous charge/discharge current
- Elevation
- Slip coefficient The inventors have also recognized and appreciated that, in some instances, the speedup distance determined at act 404 may be greater than the remaining distance determined at act 402. Accordingly, it may be determined that accelerating should begin immediately.

Referring again to FIG. 4A, one or more driver behavior adjustments may be applied at act 408. In some embodiments, for a sloppy driver, one or more of the illustrative adjustments described above in connection with FIGS. 3B-C may be applied. A suitable delay value may be predicted using a machine learning model, which may be trained using historical velocity profiles segmented by driver.

In some embodiments, for an aggressive driver, one or more of the illustrative adjustments described above in connection with FIGS. 3A, D may be applied. A suitable multiplier for acceleration $$\left(\text{e.g.,}\ \frac{a_2}{a_1}\right)$$

and/or a suitable multiplier for velocity (e.g., 1.2) may be predicted using one or more machine learning models, which may be trained using historical velocity profiles segmented by driver.

Although details of implementation are described above and shown in FIG. 4A, it should be appreciated that aspects of the present disclosure are not limited to any particular manner of implementation. For instance, aspects of the present disclosure are not limited to using a speed limit of a road segment as a default velocity. In some embodiments, a default velocity may be determined based on a speed limit and a driver-specific multiplier. Such a multiplier may be predicted using one or more machine learning models, which may be trained using historical velocity profiles segmented by driver.

Additionally, or alternatively, real time traffic information may be obtained from a route planning service, and an actual traffic velocity may be used as a default velocity. If traffic conditions vary throughout the road segment, the road segment may be divided into sub-segments, where each sub-segment may have a respective traffic velocity.

However, it should be appreciated that aspects of the present disclosure are not limited to predicting a velocity profile for a vehicle in operation. In some embodiments, a velocity profile may be predicted as part of a simulation. In that case, historical traffic information may be used instead of real time traffic information.

Figure 4B:
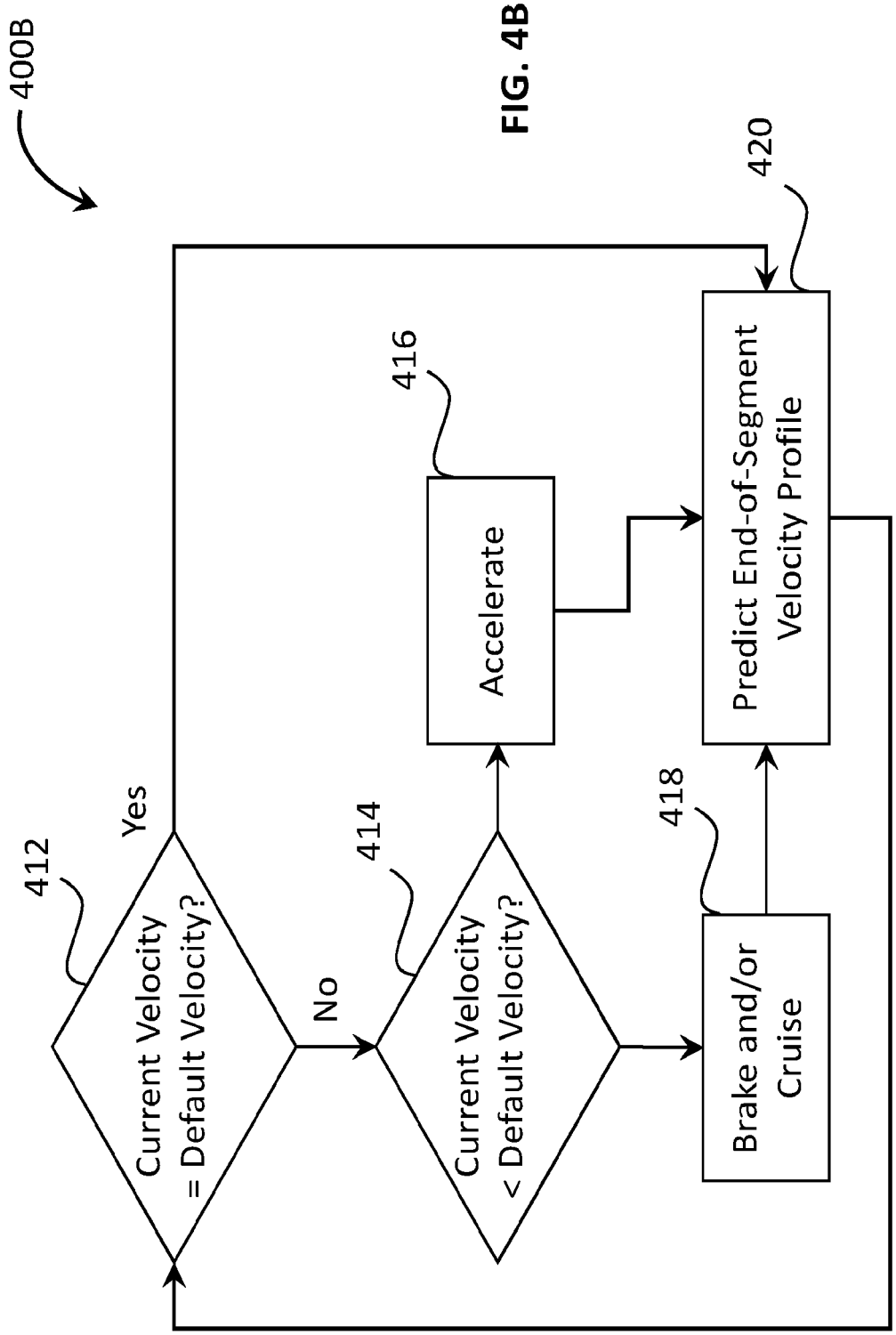
FIG. 4B shows an illustrative process 400B for predicting an overall velocity profile for a road segment, in accordance with some embodiments.

FIG. 4B shows an illustrative process 400B for predicting an overall velocity profile for a road segment, in accordance with some embodiments. Similar to the example in FIG. 4A, a velocity profile may be predicted for a vehicle traveling from a current position on a road segment to an end of the road segment. The current position may be a starting point of the road segment, or some intermediate point.

At act 412, it may be determined whether a current velocity matches a default velocity for the road segment. In some embodiments, if the velocity profile is being predicted for a vehicle in operation, the current velocity may be received from a velocity sensor and/or a GPS device. If, however, the velocity profile is being predicted during a simulation, a current velocity may be a velocity chosen for a current time step (e.g., based on analysis relating to one or more preceding time steps).

In some embodiments, the default velocity for the road segment may be determined based on a speed limit of the road segment (with or without using a driver-specific multiplier). Additionally, or alternatively, the default velocity for the road segment may be determined based on real time and/or historical traffic information.

If it is determined at act 412 that the current velocity matches the default velocity for the road segment, the process 400B may proceed to act 420, where a process similar to the illustrative process 400A shown in FIG. 4A may be performed to predict an end-of-segment velocity profile.

If it is determined at act 412 that the current velocity does not match the default velocity for the road segment, the process 400B may proceed to act 414, where it may be determined whether the current velocity is less than the default velocity for the road segment. If so, the process 400B may proceed to act 416, where an acceleration value may be determined.

The acceleration value may be determined in any suitable manner, for example, as described in connection with FIG. 4A. For instance, the acceleration value may be determined by accessing a lookup table, using a machine learning model, capping at a maximum acceleration value, etc. In some embodiments, a lookup table may be accessed using the current velocity, the default velocity (as a target velocity), and/or a driver behavior label (e.g., aggressive, conservative, sloppy, careful, etc.). Such a lookup table may be populated by analyzing historical velocity profiles.

In some embodiments, a distance may be computed for the acceleration phase, for example, based on the current velocity and the acceleration value. This distance may in turn be used, along with the current position, to compute a position for the end of the acceleration phase. The process 400B may then proceed to act 420, where a process similar to the illustrative process 400A shown in FIG. 4A may be performed to predict an end-of-segment velocity profile. The position for the end of the acceleration phase may be used as a current position for predicting the end-of-segment velocity profile.

As described above in connection with the example of FIG. 4A, a stopping distance determined at act 404 of the process 400A may be greater than a remaining distance determined at act 402 of the process 400A. That may trigger an exception (not shown in FIG. 4B), which may cause the process 400B to return to act 416 to re-compute a distance for the acceleration phase, for example, by using a target velocity that is lower than the default velocity. Additionally, or alternatively, the exception may cause the process 400B to discard act 416 and switch to act 418.

Returning to act 414, if it is determined that the current velocity is greater than the default velocity for the road segment. If so, the process 400B may proceed to act 418, where a deceleration value for cruising may be determined. The deceleration value for cruising may be determined in any suitable manner, for example, as described in connection with FIG. 4A. For instance, the deceleration value may be determined by accessing a lookup table, using a machine learning model, capping at a maximum deceleration value, etc. In some embodiments, a lookup table may be accessed using the current velocity, the default velocity (as a target velocity), and/or a driver behavior label (e.g., aggressive, conservative, sloppy, careful, etc.). Such a lookup table may be populated by analyzing historical velocity profiles.

Additionally, or alternatively, if the current velocity is greater than a selected threshold, it may be determined that braking should begin immediately, followed by cruising, or vice versa. In some embodiments, a machine learning model may be used to predict a pattern of braking and/or cruising, for example, as described above in connection with act 406 of the illustrative process 400A in the example of FIG. 4A.

It should be appreciated that the velocity threshold for determining whether to brake and/or cruise may be determined in any suitable manner. For instance, the threshold may be computed by multiplying the speed limit of the current road segment by a safety index, which may be a unitless number greater than 1 (e.g., 1.1). Additionally, or alternatively, the threshold may be computed by adding a constant (e.g., 5 mph) to the speed limit of the current road segment.

In some embodiments, a distance may be computed for the deceleration phase, for example, based on the current velocity and one or more deceleration values for cruising and/or braking. This distance may in turn be used, along with the current position, to compute a position for the end of the deceleration phase. The process 400B may the proceed to act 420, where a process similar to the illustrative process 400A shown in FIG. 4A may be performed to predict an end-of-segment velocity profile. The position for the end of the deceleration phase may be used as a current position for predicting the end-of-segment velocity profile.

In some embodiments, the process 400B may be repeated one or more times as the vehicle proceeds along the current road segment. As a result, one or more updated velocity profiles may be generated based on up-to-date information, such as actual traffic, actual velocity profile, actual driver behavior, etc.

In some embodiments, one or more machine learning models used for predicting a velocity profile (e.g., those described in connection with FIGS. 4A-B) may have one or more of the following inputs, and/or one or more other inputs. If multiple continuous inputs are used, such inputs may have the same sampling rate, or different sampling rates.

Planned route information
Endpoints of road segments, traffic, speed limits, signs, signals, etc.
Driver information
Driver requested cabin temperature, fan speed, etc.
Driver behavior represented in any suitable manner, such as a lookup table for equation constants, etc.
Historical velocity profiles for planned route
Environment information
Atmospheric temperature, pressure, humidity, etc.
Energy storage information
State of charge (SOC), state of health (SOH), temperature, voltage, current, etc.
Vehicle information
Accelerator pedal position and/or rate of change thereof
Brake pedal position and/or rate of change thereof
Vehicle velocity
Cabin temperature
Actual route traveling (if different from planned route)
Historical information
Driver requested cabin temperature, fan speed, etc.
Atmospheric temperature, pressure, humidity, etc.
Control strategy employed
Achieved final SOC
Observed traffic
Idle time (e.g., vehicle standing still in traffic, at signal, etc.)
Other information
Output of another machine learning model (e.g., predicted power demand)

In some embodiments, one or more machine learning models used for predicting a driver behavior (e.g., those described in connection with FIGS. 4A-B) may have one or more of the following inputs, and/or one or more other inputs.

Accelerator pedal position and/or rate of change thereof
Brake pedal position and/or rate of change thereof
Steering wheel rotation rate
Driver behavior represented in any suitable manner, such as a lookup table for equation constants, etc.
Average speeds (e.g., city and highway)
Total time for city driving (e.g., as a percentage of total driving time)
Total time for highway driving (e.g., as a percentage of total driving time)
Total time of cruising (e.g., as a percentage of total driving time)
Average number of instances of accelerate-brake-accelerate pattern (e.g., per mile traveled or hour driven)

The inventors have recognized and appreciated that certain driver behaviors may lead to energy inefficiency, premature aging of energy storage systems, and/or other undesirable outcomes. Accordingly, in some embodiments, techniques are provided for influencing driver behavior. For instance, a recommended velocity may be displayed to a driver (e.g., via a dashboard display, an infotainment system, a dash-mounted mobile device, a head-up display, etc.). The recommended velocity may be dynamically selected, for example, to reduce energy consumption and/or travel time.

Figure 4C:
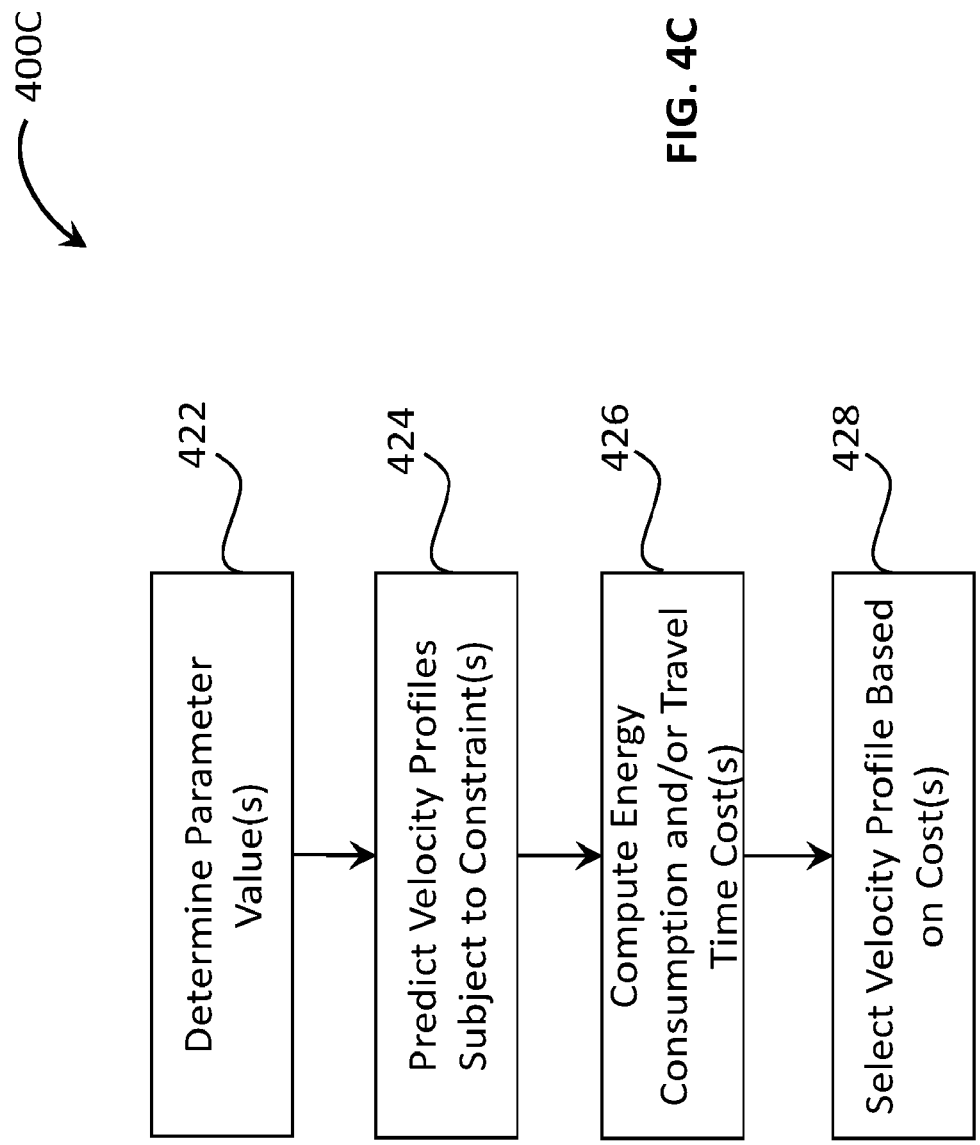
FIG. 4C shows an illustrative process 400C for selecting a velocity profile, in accordance with some embodiments.

FIG. 4C shows an illustrative process 400C for selecting a velocity profile, in accordance with some embodiments. The process 400C may be performed at any suitable point along a route of an electric vehicle, such as at a starting point and/or any intermediate point of the route. Additionally, or alternatively, the process 400C may be performed during simulation.

In some embodiments, the process 400C may be performed for a given selection horizon. For instance, the selection horizon may include one or more road segments along the route, such as N consecutive road segments starting from a current road segment, for some selected N≥1. As an example, the selection horizon may include only the current road segment. As another example, the selection horizon may include all road segments in the route.

Additionally, or alternatively, the selection horizon may include a selected portion of the route, such as a portion of a selected distance, starting from a current position of the electric vehicle. One or more partial and/or complete road segments covered by the selected portion of the route may then be determined.

Additionally, or alternatively, the selection horizon may include a window of time, such as a window of a selected duration, starting from a current time. One or more partial and/or complete road segments that are expected to be traversed during that time window may be estimated, for example, based on respective speed limits and/or traffic conditions of the one or more road segments.

At act 422, one or more parameter values may be determined. For instance, there may be one or more parameters relating to one or more road segments within the selection horizon, such as respective lengths of the one or more road segments, respective speed limits, respective intersection information (e.g., presence of a traffic signal or a stop sign at the end of a road segment), and/or respective traffic information. Any suitable traffic information may be obtained, such as a historical (or current) congestion coefficient, which may be a unitless number to be multiplied with a speed limit to obtain a historical (or current) average velocity. As another example, a historical (or current) average wait time for a traffic signal or a stop sign may be obtained.

The inventors have recognized and appreciated that, in some instances, different speed limits may be in effect at different portions of a road segment. Accordingly, in some embodiments, such a road segment may be re-segmented where a change in speed limit occurs.

In some embodiments, there may be one or more parameters relating to a driver of the electric vehicle, in addition to, or instead of, one or more parameters relating to one or more road segments. For instance, a driving history of the driver may be obtained, such as one or more historical velocity profiles traversing the same route. In some embodiments, historical velocity profiles of the driver may be segmented based on time of day, day of week, and/or workday vs. non-workday.

Additionally, or alternatively, there may be one or more parameters relating to one or more energy storage devices of the electric vehicle, such as currently available energy for discharge, currently available capacity for regenerative charging, maximum instantaneous charge/discharge current with respect to a current state of charge and/or one or more other states of charge, etc.

At act 424, multiple candidate velocity profiles may be predicted for the selection horizon. For instance, there may be one or more variables, where each variable may take on several different values. As an example, there may be two variables, driver aggressiveness and driver sloppiness. Driver aggressiveness may take on one of two values: aggressive vs. conservative. Driver sloppiness may take on one of two values: sloppy vs. careful. Thus, four different combinations may be possible, which may result in four different predicted velocity profiles.

In some embodiments, velocity profiles may be predicted using the illustrative process 400A in the example of FIG. 4A and/or the illustrative process 400A in the example of FIG. 4B. Any suitable input may be provided to the process 400A and/or the process 400B, such as a selected combination of one or more variable values (e.g., aggressive and/or sloppy), and/or the one or more parameter values determined at act 422.

In some embodiments, a predicted velocity profile may be analyzed to determine if one or more constraints are satisfied. As an example, the process 400C may check whether there is a road segment in the selection horizon where the velocity profile exceeds a threshold that is based on a speed limit for that road segment. For instance, the threshold may be computed by multiplying the speed limit by a safety index, which may be a unitless number greater than 1 (e.g., 1.1). Additionally, or alternatively, the threshold may be computed by adding a constant (e.g., 5 mph) to the speed limit.

As another example, the process 400C may check, for every non-final road segment in the selection horizon, whether a value of the velocity profile at the end of the non-final road segment matches a value of the velocity profile at the beginning of the following road segment.

As another example, the process 400C may check, for every stop sign along a road segment in the selection horizon, whether a value of the velocity profile at the stop sign is zero.

In some embodiments, a predicted velocity profile that violates a constraint may be removed from consideration. Additionally, or alternatively, such a predicted velocity profile may be modified. For instance, if a velocity profile exceeds a threshold for a road segment, the velocity profile may be reduced to the threshold wherever the threshold is exceeded. Additionally, or alternatively, one or more constraints may be used at act 428 (described below) to select a velocity profile from multiple candidate velocity profiles.

At act 426, a total energy consumption for the selection horizon may be computed for each velocity profile predicted at act 424. For instance, a total energy consumption may be computed based on an acceleration profile (e.g., derived from the velocity profile), an estimated weight of the vehicle, an energy efficiency of the vehicle, one or more road conditions (e.g., a slip coefficient), one or more weather conditions (e.g., wind heading and/or speed), etc.

Additionally, or alternatively, a total travel time for the selection horizon may be computed for each velocity profile predicted at act 424. For instance, a total travel time may be computed based on lengths of one or more road segments in the selection horizon, expected wait times at one or more stop signs and/or traffic signals, etc. Such information may be obtained from a route planning service (e.g., Google Maps, Apple Maps, etc.) and/or an Internet-of-Things (IoT) traffic signal control system.

In some embodiments, a velocity profile that results in a total travel time that is more than a threshold percentage (e.g., 5%, 10%, 15%, 20%, etc.) above an expected travel time may be removed from consideration. The threshold percentage may be determined in any suitable manner, for example, based on driver input.

In some embodiments, one or more costs may be computed for each velocity profile. For instance, an energy consumption cost may be computed based on the total energy consumption for the velocity profile. This may be done in any suitable manner, for example, by converting the total energy consumption to a unitless quantity, and/or scaling up by a suitable multiplier, so that even a small change in total energy consumption may result in an significant change in energy consumption cost. Additionally, or alternatively, a travel time cost may be computed based on the total travel time for the velocity profile in a similar manner.

In some embodiments, the energy consumption cost, the travel time cost, and/or one or more other costs may be combined to obtain an overall cost for the velocity profile. For instance, the one or more costs may be combined using a weighted sum. One or more respective weights may be chosen in any suitable manner. As an example, if conservation of energy is more important than arriving quickly at a destination, then a weight for the energy consumption cost may be higher than that for the travel time cost, or vice versa.

At act 428, a velocity profile with a lowest cost may be selected. Any suitable selection technique may be used, such as an exact optimization technique or a heuristic technique. For instance, a non-linear programming technique may be used to select a velocity profile, subject to one or more constraints (e.g., one or more of the illustrative constraints described above in connection with act 424).

In some embodiments, the process 400C may be repeated one or more times as the vehicle proceeds along the route. As a result, one or more updated velocity profiles may be generated and/or selected based on up-to-date information, such as actual traffic, actual road conditions, etc.

Although details of implementation are described above and shown in FIG. 4C, it should be appreciated that aspects of the present disclosure are not limited to any particular manner of implementation. For instance, aspects of the present disclosure are not limited to computing an energy consumption cost, a travel time cost, or any cost at all. Moreover, aspects of the present disclosure are not limited to using a selected velocity profile to provide a velocity recommendation to a driver. In some embodiments, a selected velocity profile may be used to set a target velocity when the vehicle's cruise control is activated, or if the vehicle is a driverless car or a drone.

FIG. 5 shows an illustrative process 500 for selecting one or more energy management strategies, in accordance with some embodiments. For instance, the process 500 may be used to select one or more energy management strategies from the illustrative collection of energy management strategies 154 shown in FIG. 1B.

At act 502, simulations may be performed using a plurality of different energy management strategies. In some embodiments, some or all of these simulations may be performed in parallel, so that more simulations may be completed in a shorter amount of time. Additionally, or alternatively, some or all of these simulations may be performed by a remote energy storage management system (e.g., the illustrative remote energy storage management system 150 in the example of FIG. 1B), which may have more computational resources than a local energy storage management system (e.g., the illustrative local energy storage management system 160 in the example of FIG. 1B).

In some embodiments, a simulation may be performed by maintaining one or more state variables, which may have one or more respective initial values at time $t_0$, and may evolve over a simulation period $[t_0, t_0+T]$ according to an energy management strategy that is being applied in that particular simulation. Examples of state variables include, but are not limited to, state of charge, state of health, voltage, current, C-rate, charging/discharging efficiency, etc. of each energy storage device in an energy storage system configuration.

In some embodiments, the simulation period $[t_0, t_0+T]$ may include N control cycles, where each control cycle may have a duration of T/N. At the beginning of a control cycle, the energy management strategy may be applied based on an energy application power profile, an energy storage environmental profile, and/or one or more respective values of the one or more state variables at the beginning of the control cycle. In some embodiments, the energy application power profile may be provided based on a velocity profile (e.g., a velocity profile predicted using the illustrative process 400B shown in FIG. 4B, and/or selected using the illustrative process 400C shown in FIG. 4C). Additionally, or alternatively, the energy application power profile may be provided based on an auxiliary system power profile (e.g., a power profile for driver cabin HVAC, predicted based on weather, driver preference, etc.)

In some embodiments, the energy management strategy may output a power distribution to be effectuated during the control cycle. One or more energy storage device models, which may be selected based on the energy storage system configuration, may then be used to determine how the one or more state variables may evolve during the control cycle. For instance, a time series may be determined for a state variable during the control cycle. The time series may include just one value (e.g., a final value of the state variable at the end of the control cycle), or multiple values (e.g., intermediate values of the state variable throughout the control cycle).

In some embodiments, the above process may be repeated N times, where each state variable may be initialized at the beginning of each control cycle based on the state variable's value at the end of the previous control cycle. Accordingly, one or more performance variables (e.g., $\Delta$SoC, $\Delta$SoH, etc.) pertaining to an energy storage device may be computed. For instance, one or more values for each performance variable may be output as a time series for the entire simulation period $[t_0, t_0+T]$.

In some embodiments, the time series for the entire simulation period may be obtained by concatenating the time series for individual control cycles. Additionally, or alternatively, the time series for the entire simulation period may include derived values, such as an average value for each control cycle.

In some embodiments, a simulated performance profile may be provided for each energy storage device in the energy storage system configuration. Such a performance profile may include, for each state variable pertaining to the corresponding energy storage device, the time series for the entire simulation period $[t\_0, t\_0+T]$ for that state variable.

Referring again to FIG. 5, one or more energy management strategies may be selected based on simulation results from act 502. For instance, the strategies used in the simulations performed at act 502 may be ranked based on one or more criteria, such as cycle efficiency, which may be determined as a ratio between total charge extracted from an energy storage device and total charge put into the energy storage device over one full cycle (e.g., 0% to 100% to 0% ideally, or 10% to 90% to 10% in some practical scenarios). One or more top ranking strategies may be selected, such as top one, two, three, four, five, six, seven, eight, nine, ten, eleven, twelve, thirteen, fourteen, fifteen, etc. strategies.

At act 506, the one or more strategies selected at act 504 may be deployed. For instance, a selected strategy may be applied to one or more suitable inputs, and a power distribution output by the strategy may be used to provide control signals to power electronics (e.g., the illustrative power electronics 104 shown in FIG. 1A) and/or one or more energy storage device managers (e.g., the illustrative device managers 114A-B shown in FIG. 1A). If there are multiple selected strategies, such strategies may be applied in a selected sequence (e.g., each for a selected period of time), or in some other suitable manner (e.g., using an exploration value $0 < \epsilon \leq 1$ as described below).

At act 508, observations may be collected during deployment of the one or more selected strategies. Examples of observations that may be collected include, but not limited to, an actual velocity profile, an actual performance profile for an energy storage device, etc. An actual performance profile may involve any suitable state variable or combination of state variables of an energy storage device, and may include a time series of measurements for each such state variable.

In some embodiments, the process 500 may be repeated one or more times, and the observations collected at act 508 may be used when performing subsequent simulations. For instance, a reduced order model (ROM) may be used to reduce simulation time when the process 500 is run initially. When the process 500 is repeated, simulations may be performed based on a full order model and/or observations collected during one or more prior runs of the process 500.

Illustrative techniques for managing energy storage systems are further described in International Application No. PCT/US2019/050845, filed on Sep. 12, 2019, entitled "SYSTEMS AND METHODS FOR MANAGING ENERGY STORAGE SYSTEM," which is hereby incorporated by reference in its entirety.

The inventors have recognized and appreciated that performance of an energy management strategy may depend on a context in which the energy management strategy is deployed. For instance, an energy management strategy may map one or more inputs to a power distribution among a plurality of energy storage devices associated an energy application. Such an energy management strategy may perform better or worse depending on conditions of the energy storage devices, the energy application itself, and/or an environment in which the energy application is operating.

Accordingly, in some embodiments, techniques are provided for selecting an energy management strategy from a plurality of energy management strategies. Such a technique may attempt to strike a desired balance between: (1) selecting an energy management strategy that is known to perform well in a certain context, and (2) trying other energy management strategies to see if any of the other energy management strategies may perform even better in that context.

In some embodiments, an energy management strategy may receive, as input, a value output by an estimation model. The inventors have recognized and appreciated that accuracy of an estimation model may depend on a context in which the estimation model is deployed. For instance, an estimation model may map one or more inputs to an estimated value of a dependent variable relating to an energy application, an energy storage device associated the energy application, or an environment in which the energy application is operating. The estimated value of the dependent variable may be an estimate of a current or future value of the dependent variable. Such an estimation model may be more or less accurate (e.g., estimated value matching observed value) depending on conditions of the energy storage devices, the energy application itself, and/or an environment in which the energy application is operating.

The inventors have recognized and appreciated that techniques for selecting an energy management strategy from a plurality of energy management strategies may also be used for selecting an estimation model from a plurality of estimation models. Such a technique may attempt to strike a desired balance between: (1) selecting an estimation model that is known to accurate in a certain context, and (2) trying other estimation models to see if any of the other estimation models may be even more accurate in that context.

The inventors have further recognized and appreciated that it may be desirable to share knowledge about energy management strategy performance and/or estimation model accuracy across similar energy applications, such as electrical vehicles that are similarly constructed and/or similarly equipped. For instance, Vehicle A and Vehicle B may belong to a same class of vehicles, and may have a same type of energy storage system (ESS). Vehicle A may be based in Sydney, Australia, whereas Vehicle B may be based in Oslo, Norway. With an ambient temperature of −10° C. and an ESS operating temperature of +10° C., the capacity of the ESS in Vehicle B may be found to be 3% higher than estimated. Moreover, at a 1.3C discharge, the equivalent series resistance (ESR) of the ESS in Vehicle B may be found to be 7% lower than estimated.

In some embodiments, data collected from other vehicles in a same class operating in a same context (e.g., ambient temperature within a first range of −10° C., and/or ESS operating temperature within a second range of +10° C.) may be analyzed to determine if similar discrepancies are also observed (e.g., capacity discrepancies within a third range, and/or ESR discrepancies within a fourth range). If so, it may be inferred that the estimation model for capacity and/or the estimation model for ESR that are currently deployed in Vehicle B may be inaccurate in that context. Otherwise, it may be inferred that the discrepancies observed at Vehicle B may be due to data noise, which may advantageously prevent unnecessary updates to the estimation models in Vehicle B.

Additionally, or alternatively, data collected from a same vehicle operating in a same context repeatedly may be analyzed to determine if similar discrepancies are observed consistently (e.g., over a threshold percentage of occurrences). If so, it may be inferred that a currently deployed estimation model may be inaccurate in that context. Otherwise, it may be inferred that discrepancies observed on just a few occasions may be due to data noise.

In some embodiments, if it is determined that a currently deployed estimation model may be inaccurate in a given context, the estimation model may be replaced by a model that is deemed more accurate in that context. For instance, if it is determined that similar discrepancies in capacity and ESR are observed across many vehicles in a same class operating in a same context (e.g., above a threshold percentage of such vehicles), estimation models in such vehicles may be replaced by models that are deemed more accurate in that context. This may be done in any suitable manner (e.g., via over-the-air updates), and may allow energy management strategies in such vehicles to take advantage of improved ESS performance in that context.

It should be appreciated that a class of vehicles to be considered may be defined in any suitable manner. In some embodiments, vehicles in a same class may be of a same make, model, and/or year, in addition to, or instead of, having a same type of energy storage system.

In some embodiments, replacement models may be deployed selectively. For instance, if a discrepancy between an estimated value and an observed value is above a selected percentage threshold, deployment of a replacement model may be triggered. Additionally, or alternatively, deployment of a replacement model may be based on similarity between contexts. For example, since Vehicle A is in a different context (e.g., much higher ambient temperature and ESS operating temperature), estimation models in Vehicle A may not be replaced immediately. However, program logic may be provided to trigger replacement of the estimation models when colder conditions are experienced in the future.

Similarity between contexts may be determined in any suitable manner. For instance, in some embodiments, given two values of a same observable feature, a normalized difference may be provided, which may be a value in [0,1]. Given two contexts based on a same underlying set of features, a difference between the two contexts may be calculated as a weighted sum of respective differences between corresponding feature values. However, it should be appreciated that aspects of the present disclosure are not limited to comparing contexts in any particular way, or at all.

In some embodiments, techniques are provided for selecting a model from a model category comprising a plurality of candidate models. For instance, a model category may be provided that comprises a plurality of energy management strategies. Additionally, or alternatively, a model category may be provided that comprises a plurality of estimation models for a dependent variable relating to an energy application. Such estimation models may be referred to as energy application models. Additionally, or alternatively, a model category may be provided that comprises a plurality of estimation models for a dependent variable relating to an energy storage device associated with the energy application. Such estimation models may be referred to as energy storage device models. Additionally, or alternatively, a model category may be provided that comprises a plurality of estimation models for a dependent variable relating to an environment in which the energy application is operating. Such estimation models may be referred to as environment models.

In some embodiments, a context may include a plurality of values, where each value may correspond to an observable feature. For instance, a context C may include a value of a feature relating to an environment in which an energy application is operating (e.g., an ambient temperature, a road condition, etc.), a value of a feature relating to the energy application (e.g., a total vehicle mass, a time to destination, a driver requested velocity, a driver requested cabin temperature, etc.), and/or a value of a feature relating to one or more energy storage devices associated with the energy application (e.g., an energy storage operating temperature, a state of charge, etc.).

In some embodiments, techniques are provided for selecting a model from a model category so as to increase one or more rewards (or to reduce one or more costs). As one example, a model category M may include a plurality of energy management strategies for an ESS of an electric vehicle, and an energy management strategy m may be selected to increase the ESS's state of health upon the vehicle's arrival at a destination. Thus, a reward function $r(C, m)$ may depend on the ESS's state of health after deploying the energy management strategy m in the context C. Additionally, or alternatively, the reward function $r(C, m)$ may be provided to increase drive cycle efficiency (kWh/km), energy recovered during regenerative braking instances, etc., and/or to decrease thermal losses, cyclical oscillation of high energy device, second derivative of high energy device power demand, etc.

As another example, a model category M may include a plurality of estimation models for a dependent variable, and an estimation model m may be selected to increase accuracy. Thus, a reward function r(C, m) may depend on a difference between an estimated value of the dependent variable and an observed value of the dependent variable.

In some embodiments, if an energy management strategy m has been deployed multiple times in a context C, a suitable statistic of a reward may be used, such as mean, medium, mode, maximum, minimum, etc.

In some embodiments, repeated selections from a model category M may be performed with an objective to increase aggregate reward (or to reduce aggregate cost). At each selection, two possible approaches may be taken: (1) exploitation—attempting to increase reward based on what is currently known about the models in M; and (2) exploration—attempting to learn more about the models in M.

For instance, an exploration value $0<\epsilon \leq 1$ may be chosen (e.g., $\epsilon=0.5$). The exploration approach may be chosen with probability $\epsilon$, whereas the exploitation approach may be chosen with probability $1-\epsilon$. An illustrative technique using such an exploration value is shown in the pseudo code below.

```
input: context C, exploration value 0 < ε ≤ 1, model category M
output: selected model m ∈ M
if not every model in M has been deployed in the context C
then
    select model m uniformly at random from model(s) in M that
    have not been deployed in the context C
else
    select number u uniformly at random from [0, 1] ;
    if u ≥ ε then
        select model m with highest average reward r̄(C,m) seen
        so far in the context C
    else
        select model m uniformly at random from M
end
```

In this example, exploration is favored initially, until all models in the model category M have been deployed at least once in the context C. Thereafter, the exploration value E is used to choose between exploitation and exploration.

It should be appreciated that the above technique is provided solely for purposes of illustration. One or more variations of this technique, and/or one or more other techniques, may be used to select models from a model category to increase reward in a given context. For instance, in some embodiments, a rule may be used to eliminate one or more models from the model category M that are deemed to be unsuitable in the context C.

Other examples of techniques that may be used are discussed in "A Practical Method for Solving Contextual Bandit Problems Using Decision Trees" by Elmachtoub et al.[3]

[3] In Proceedings of the 33rd Conference on Uncertainty in Artificial Intelligence (UAI 2017).

Figure 6:
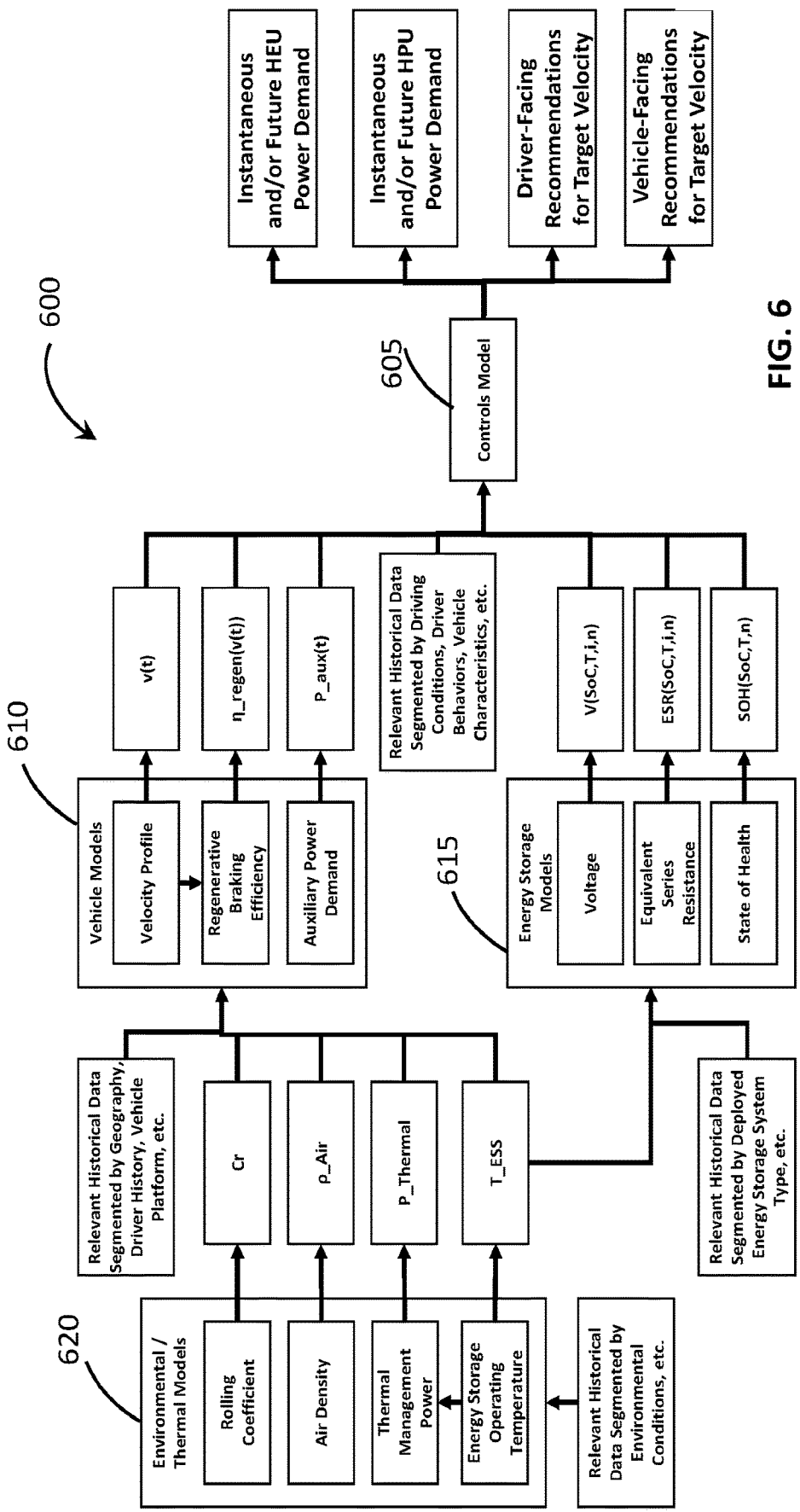
FIG. 6 shows an illustrative network 600 of model categories, in accordance with some embodiments.

FIG. 6 shows an illustrative network 600 of model categories, in accordance with some embodiments. In this example, the network 600 includes a model category 605 comprising a plurality of energy management strategies. For instance, each energy management strategy in the model category 605 may map one or more inputs to a power distribution between a high energy device and a high power device (e.g., the illustrative energy storage devices 110A-B in the example of FIG. 1A).

In some embodiments, an input to the model category 605 may be provided by another model category. For instance, the model category 605 may receive an input from a model category comprising energy application models, such as a model category comprising estimation models for velocity profile, a model category comprising estimation models for regenerative braking efficiency, a model category comprising estimation models for auxiliary power demand, etc. Such model categories are shown in a group 610 in FIG. 6.

Additionally, or alternatively, the model category 605 may receive an input from a model category comprising energy storage device models, such as a model category comprising estimation models for voltage, a model category comprising estimation models for equivalent series resistance (ESR), a model category comprising estimation models for state of health (SOH), etc. Such model categories are shown in a group 615 in FIG. 6.

In some embodiments, a model category comprising estimation models may in turn receive an input from another model category comprising estimation models. For instance, a model category in the group 610 or 615 may receive an input from a model category comprising environment models, such as a model category comprising estimation models for rolling coefficient, a model category comprising estimation models for air density, etc.

Additionally, or alternatively, a model category in the group 610 or 615 may receive an input from a model category comprising thermal models, such as a model category comprising estimation models for energy storage device operating temperature, a model category comprising estimation models for thermal management power (e.g., power used to maintain energy storage device operating temperature within a selected range), etc.

The inventors have recognized and appreciated that, although the thermal models in the example of FIG. 6 are energy storage device models, the thermal models may receive inputs relating to an environment in which an energy application is operating. Thus, in some embodiments, selection of a thermal model may be based on historical data segmented by one or more environmental conditions. Accordingly, in FIG. 6, the thermal models are shown in a same group 620 as the environmental models.

In some embodiments, selection of models may proceed from upstream to downstream in the network 600. For instance, a model may be selected from each model category that has no input from any other model category. Such a selected model may be used to obtain an estimated value, which may in turn be provided as input to a downstream model category.

The inventors have recognized and appreciated that observable features that are relevant for selection from a first model category (e.g., velocity profile) may be different from those that are relevant for selection from a second model category (e.g., energy storage state of health). Accordingly, in some embodiments, a first context may be used when selecting a model from the first model category, while a second context, different from the first context, may be used when selecting a model from the second model category. However, it should be appreciated that aspects of the present disclosure are not limited to using different contexts for different model categories.

Additionally, or alternatively, different exploration values (ε) and/or different reward histories may be used for different model categories. However, it should be appreciated that aspects of the present disclosure are not limited to using an exploration value or a reward history to select a model from a model category.

As described in connection with the example of FIG. 1A, the illustrative master controller 102 may compare two energy management strategies to see which energy management strategy may perform better. To carry out such a comparison, the master controller may estimate one or more parameters such as predicted power demand, predicted energy storage device state of health, etc. Likewise, to estimate a parameter such as predicted energy storage device state of health, the master controller may estimate one or more other parameters such as predicted energy storage operating temperature. Thus, inaccurate modeling of parameters may, directly or indirectly, lead to false promises and/or missed opportunities for improved performance.

The inventors have recognized and appreciated that a network of model categories, such as the illustrative network 600 in the example of FIG. 6, may be used to provide adaptive control while improving accuracy of estimated parameters based on which the adaptive control is performed. For instance, adaptive control may be provided via the model category 605, while accuracy improvements may be provided via model categories in the groups 610, 615, and 620.

In some embodiments, a model may be selected from a model category in the group 620. Such selection may be based on:
 historical data segmented by one or more criteria such as one or more environmental conditions;
 dynamically obtained data (e.g., sensor measurements);
 reward history of that model category;
 etc.

The selected model may be applied to the historical data and/or the dynamically obtained data to determine an estimated value. This estimated value may then be provided to one or more model categories in the groups 610 and 615.

In some embodiments, a model may be selected from a model category in the group 610. Such selection may be based on:
 one or more estimated values from the group 620;
 historical data segmented by one or more criteria such as geography, driver history, vehicle platform, etc.;
 dynamically obtained data (e.g., sensor measurements);
 reward history of that model category;
 etc.

The selected model may be applied to the historical data and/or the dynamically obtained data to determine an estimated value. This estimated value may then be provided to the model category 605.

In some embodiments, a model may be selected from a model category in the group 615. Such selection may be based on:
 one or more estimated values from the group 620;
 historical data segmented by one or more criteria such as deployed energy storage system type;
 dynamically obtained data (e.g., sensor measurements);
 reward history of that model category;
 etc.

The selected model may be applied to the historical data and/or the dynamically obtained data to determine an estimated value. This estimated value may then be provided to the model category 605.

In some embodiments, a model may be selected from the model category 605. Such selection may be based on:
 one or more estimated values from the groups 610 and/or 615;
 historical data segmented by one or more criteria such as one or more driving conditions, one or more driver behaviors, one or more vehicle characteristics, etc.;
 dynamically obtained data (e.g., sensor measurements);
 reward history of the model category 605;
 etc.

The selected model may be applied to the historical data and/or the dynamically obtained data to determine instantaneous and/or future power demands of a high energy device, instantaneous and/or future power demands of a high power device (e.g., if a heterogenous energy storage system is used), one or more driver-facing recommendations for target velocity, one or more vehicle-facing recommendations for target velocity, etc.

It should be appreciated that aspects of the present disclosure are not limited to using any particular model category or set of model categories, or to arranging model categories in any particular manner. For instance, in some embodiments, the model category 605 may receive an input directly from a model category comprising environment models, and/or an input directly from a model category comprising thermal models.

In some embodiments, model selection may be performed in parallel at a remote energy storage management system and a local energy storage management system (e.g., the illustrative remote energy storage management system 150 and the illustrative local energy storage management system 160 in the example of FIG. 1B). The inventors have recognized and appreciated that a remote energy storage management system may have more computational resources (e.g., memory, processing cycles, etc.) and/or access to more data (e.g., historical data, data from multiple energy applications, etc.). Therefore, a remote energy storage management system may be able to explore larger model categories, and therefore discover more accurate estimation models and/or energy management strategies with better performance.

For instance, for a given model category, a remote energy storage management system may analyze a large number of models, which may be based on different mathematical modeling approaches, and/or may use different approximation techniques. By contrast, for a same model category, a local energy storage management system may analyze a small number of models, such as estimation models that are deemed accurate by the remote energy storage management system, and/or energy management strategies that are deemed well performing by the remote energy storage management system. These local models may be replaced through over-the-air updates, which may be regularly scheduled and/or triggered by context changes.

Additionally, or alternatively, a remote energy storage management system may use a larger exploration value E than a local energy storage management system. Thus, the local energy storage management system may focus more on quickly adapting to changing conditions (e.g., traffic, weather, driver requests, etc.), while the remote energy storage management system may devote more computational resources to exploring different models. In this manner, the remote energy storage management system may be able to identify accurate estimation models for use by the local energy storage management system in comparing different energy management strategies, so that an energy management strategy selected by the local energy storage management system may lead to greater performance enhancement. However, it should be appreciated that aspects of the present disclosure are not limited to using any particular exploration value or combination of exploration values, or any exploration value at all.

The inventors have recognized and appreciated that it may be beneficial to have multiple (albeit a small number of) models in a model category used by a local energy storage management system. For instance, this may allow the local energy storage management system to switch to a different model if a currently deployed model is not satisfactory, without triggering an immediate over-the-air update. However, it should be appreciated that aspects of the present disclosure are not limited to having multiple models in a model category used by a local energy storage management system.

In some embodiments, live traffic data may be used to provide more accurate input to a model, and/or more accurate context for selecting a model from a model category. For instance, live traffic data may be obtained from public traffic monitoring systems and/or private traffic data providers.

In some embodiments, historical data may be segmented prior to being used for selection of models. For instance, a model category may have an associated set of one or more attribute values. As an example, a model category for velocity profile may be tagged with a certain geographic area, a certain day of week, a certain time of day, etc., based on an assumption that traffic conditions tend to have a recurring pattern. These attribute values may be used to filter historical data, and the filtered data may in turn be used to select a velocity profile model from the model category.

Additionally, or alternatively, a model category for velocity profile may be tagged with one or more attribute values indicative of driving style. For instance, drivers may be classified based on how aggressively they accelerate and/or brake (e.g., average, aggressive, conservative, etc.), and/or how quickly they respond to changes (e.g., average, sloppy, careful, etc.). Historical data may then be filtered according to one or more classification labels.

In some embodiments, biometric identification (e.g., facial recognition, fingerprint recognition, etc.) may be used to distinguish data from different individuals driving a same vehicle (e.g., members of a same household, commercial drivers working in shifts, etc.). This may improve effectiveness of driver classification.

In some embodiments, historical data may be segmented based on multiple criteria, such as geographical area, time of day, time of week, time of year, weather condition, road condition, driver behavior, etc. However, it should be appreciated that aspects of the present disclosure are not limited to segmenting data in any particular manner, or at all.

Referring again to the example of FIG. 4C, the illustrative process 400C may, in some embodiments, determine whether the route of the electric vehicle is a commuter route. For instance, the process 400C may use a clustering or other classification technique to analyze trips taken over a certain time period (e.g., past week, two weeks, three weeks, etc.). Any suitable set of one or more features may be used for clustering, such as starting point, destination, day of week, time of day, etc.

In some embodiments, the route may be considered a commuter route if the route belongs to a cluster that is larger than a selected threshold (e.g., a selected number, and/or a selected percentage, of trips). In response to determining that the route is a commuter route, the process 400C may obtain information regarding one or more past trips along the same route, such as a previously predicted velocity profile, a corresponding actual velocity profile, corresponding energy efficiency and/or total energy consumption, corresponding total travel time, etc.

In some embodiments, the process 400C may segment the past trips based on one or more criteria, such as traffic, weather, etc., and may identify one or more previously predicted velocity profiles and/or actual velocity profiles having traffic, weather, and/or other attribute values that match corresponding attribute values of the current trip. The one or more identified velocity profiles may be included as candidate velocity profiles at act 424.

The inventors have recognized and appreciated that it may be challenging for a driver to change driving style abruptly, even if the driver is aware of disadvantages of his/her current driving style (e.g., aggressive driving leading to poor energy efficiency). Accordingly, in some embodiments, the process 400C may initially favor a current driving style of the driver, but may over time transition gradually to a driving style that is more energy efficient. In this manner, the driver may be more likely to adopt a recommended velocity.

For instance, the process 400C may determine, based on one or more actual velocity profiles of past trips on the same route, whether the driver has shown aggressiveness. In some embodiments, average (e.g., mean, median, mode, etc.) acceleration and/or deceleration values may be obtained from the past trips made by the driver, and may be compared against average (e.g., mean, median, mode, etc.) acceleration and/or deceleration values for all drivers on the same route. Additionally, or alternatively, total travel times may be obtained from the past trips made by the driver, and may be compared against, for example, total travel time estimated by a route planning service (e.g., Google Maps, Apple Maps, etc.).

In some embodiments, if the driver has shown aggressiveness, the process 400C may, at act 426, select weights to prioritize total travel time over total energy consumption. For instance, a lookup table may be used that maps each driver behavior label (e.g., aggressive, conservative, sloppy, careful, etc.) to a corresponding pair of weights to be applied to the travel time cost and the energy consumption cost, respectively.

Additionally, or alternatively, the process 400C may, over future trips on the same route, steadily adjust weights to instead prioritize total energy consumption over total travel time. For instance, the process 400C may adjust weights slightly at first (e.g., increasing the energy consumption weight by 1%, 2%, 3%, 4%, 5%, etc.). If the driver adopts velocity recommendations made by the process 400C, weights may be adjusted further (e.g., increasing the energy consumption weight by 1%, 2%, 3%, 4%, 5%, etc. per trip). If the driver ignores velocity recommendations made by the process 400C for at least consecutive N trips (with some suitable N), then the process 400C may revert to weights that best match the driver's driving style.

In some embodiments, a similar approach may be adopted even if the route is not a commuter route. For instance, the process 400C may determine, based on one or more actual velocity profiles of past trips (e.g., on the same route and/or one or more different routes), whether the driver has shown aggressiveness. This may be done, for example, in a manner similar to that described above with respect to past trips on the same route.

In some embodiments, if the driver has shown aggressiveness, the process 400C may, at act 426, select weights to prioritize total travel time over total energy consumption (e.g., using a lookup table as described above). Over future trips, the process 400C may steadily adjust weights to instead prioritize total energy consumption over total travel time (e.g., by making slight adjustments at first and observing whether the driver is receptive to change, as described above).

Illustrative configurations of various aspects of the present disclosure are provided below.

1. A computer-implemented method for selecting a velocity profile for an electric vehicle, comprising acts of: determining a plurality of parameter values, the plurality of parameter values comprising: at least one first parameter value for at least one road segment in a selection horizon; and at least one second parameter value for at least one energy storage device of the electric vehicle; using the plurality of parameter values to predict a plurality of velocity profiles over the selection horizon, wherein: each velocity profile of the plurality of velocity profiles is predicted based on a corresponding value of at least one variable relating to a driving style of a driver of the electric vehicle; computing an energy consumption cost and a travel time cost for each velocity profile of the plurality of velocity profiles; and selecting, based on the respective energy consumption costs and the respective travel time costs, a velocity profile from the plurality of velocity profiles.

2. The method of configuration 1, further comprising an act of: computing an overall cost for each velocity profile of the plurality of velocity profiles, at least in part by combining the respective energy consumption cost and the respective travel time cost for the velocity profile, wherein: a first weight is applied the energy consumption cost; a second weight is applied to the travel time cost; and the first weight and the second weight are selected base on a driving history of the driver.

3. The method of configuration 2, further comprising an act of: determining, based on the driving history, whether the driver is an aggressive driver or a conservative driver; in response to determining that the driver is an aggressive driver, select the first weight and the second weight so as to prioritize travel time over energy consumption; and in response to determining that the driver is a conservative driver, select the first weight and the second weight so as to prioritize energy consumption over travel time.

4. The method of configuration 2, further comprising an act of: determining, based on the driving history, whether a current route is a commuter route for the driver; in response to determining that the current route is not a commuter route, select the first weight and the second weight so as to prioritize travel time over energy consumption; and in response to determining that the current route is a commuter route, select the first weight and the second weight so as to prioritize energy consumption over travel time.

5. The method of configuration 1, wherein: determining the plurality of parameter values comprises: using a first machine learning model to estimate the at least one first parameter value for the at least one road segment in the selection horizon; and/or using a second machine learning model to estimate the at least one second parameter value for the at least one energy storage device of the electric vehicle.

6. The method of configuration 1, wherein: the plurality of velocity profiles comprises a plurality of first velocity profiles; and using the plurality of parameter values to predict the plurality of first velocity profiles comprises: using the plurality of parameter values to predict a plurality of second velocity profiles; for each second velocity profile, checking whether the second velocity profile satisfies at least one constraint; and in response to determining that the second velocity profile does not satisfy the at least one constraint, removing or modifying the second velocity profile.

7. The method of configuration 1, wherein: predicting a velocity profile comprises: comparing a current velocity against a selected default velocity for a current road segment; and in response to determining that the current velocity matches the default velocity for the current road segment, predicting an end-of-segment velocity profile.

8. The method of configuration 7, wherein: predicting an end-of-segment velocity profile comprises: determining a distance between a current position and an endpoint of the current road segment; determining a stopping distance, a cruising distance, or a speedup distance from the endpoint of the current road segment; determining, based on the distance between the current position and the endpoint of the current road segment, and based on the stopping distance, the cruising distance, or the speedup distance, a time to brake, cruise, or accelerate; and applying at least one driver behavior adjustment.

9. The method of configuration 7, wherein: predicting a velocity profile further comprises: in response to determining that the current velocity is less than the default velocity for the current road segment, determining an acceleration value and a distance for an acceleration phase.

10. The method of configuration 7, wherein: predicting a velocity profile further comprises: in response to determining that the current velocity is greater than the default velocity for the current road segment: determining whether to brake and/or cruise; and determining a deceleration value for braking and/or cruising, and a distance for a deceleration phase.

11. A system comprising: at least one computer processor; and at least one computer-readable medium having stored thereon instructions which, when executed, program the at least one computer processor to perform the method of any of configurations 1-10.

12. At least one computer-readable medium having stored thereon instructions which, when executed, program at least one computer processor to perform the method of any of configurations 1-10.

Figure 7:
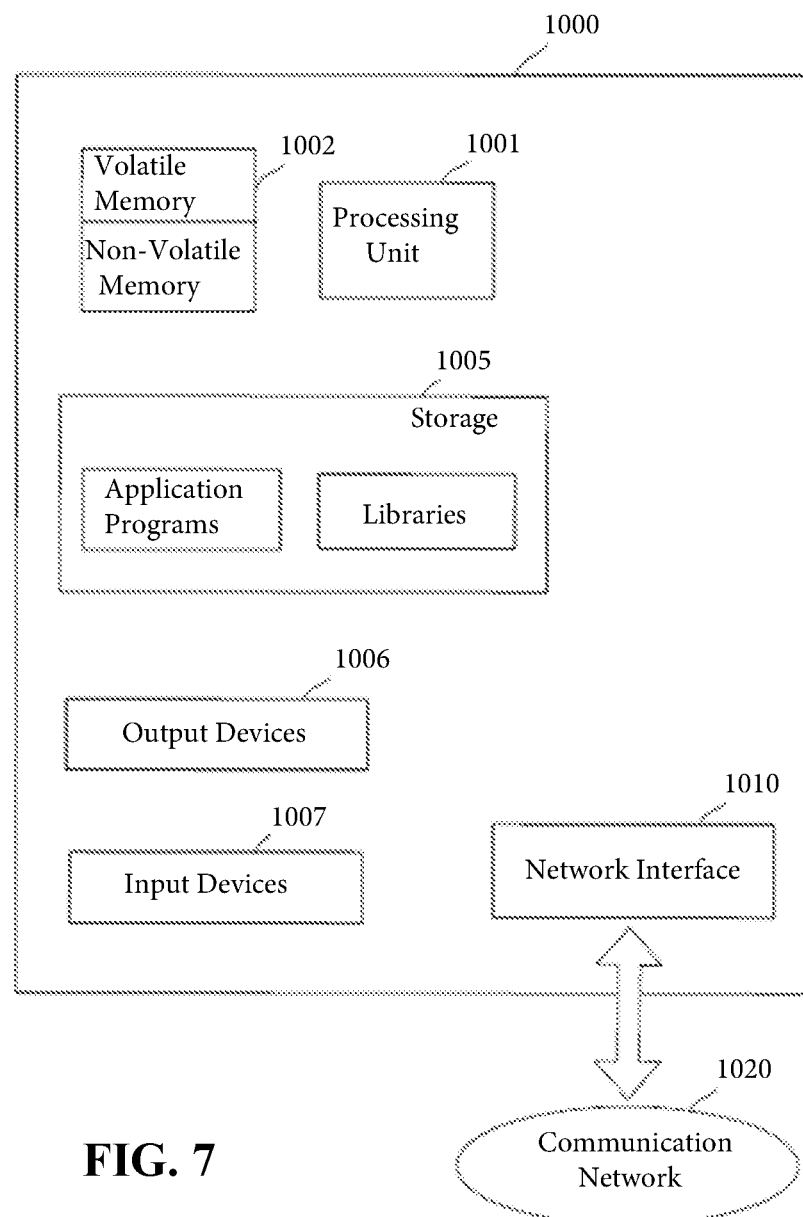
FIG. 7 shows an illustrative system 1000 on which one or more aspects of the present disclosure may be implemented, in accordance with some embodiments.

FIG. 7 shows, schematically, an illustrative computer 1000 on which any aspect of the present disclosure may be implemented.

In the example shown in FIG. 7, the computer 1000 includes a processing unit 1001 having one or more processors and a non-transitory computer-readable storage medium 1002 that may include, for example, volatile and/or non-volatile memory. The memory 1002 may store one or more instructions to program the processing unit 1101 to perform any of the functions described herein. The computer 1000 may also include other types of non-transitory computer-readable medium, such as storage 1005 (e.g., one or more disk drives) in addition to the system memory 1002. The storage 1005 may also store one or more application programs and/or resources used by application programs (e.g., software libraries), which may be loaded into the memory 1002.

The computer 1000 may have one or more input devices and/or output devices, such as devices 1006 and 1007 illustrated in FIG. 7. These devices may be used, for instance, to present a user interface. Examples of output devices that may be used to provide a user interface include printers, display screens, and other devices for visual output, speakers and other devices for audible output, braille displays and other devices for haptic output, etc. Examples of input devices that may be used for a user interface include keyboards, pointing devices (e.g., mice, touch pads, and digitizing tablets), microphones, etc. For instance, the input devices 1007 may include a microphone for capturing audio signals, and the output devices 1006 may include a display screen for visually rendering, and/or a speaker for audibly rendering, recognized text.

In the example shown in FIG. 7, the computer 1000 also includes one or more network interfaces (e.g., the network interface 1010) to enable communication via various networks (e.g., the network 1020). Examples of networks include local area networks (e.g., an enterprise network), wide area networks (e.g., the Internet), etc. Such networks may be based on any suitable technology and operate according to any suitable protocol, and may include wireless networks and/or wired networks (e.g., fiber optic networks).

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing descriptions and drawings are by way of example only.

The above-described embodiments of the present disclosure can be implemented in any of numerous ways. For example, the embodiments may be implemented using hardware, software, or a combination thereof. When implemented in software, the software code may be executed on any suitable processor or collection of processors, whether provided in a single computer, or distributed among multiple computers.

Also, the various methods or processes outlined herein may be coded as software that is executable on one or more processors running any one of a variety of operating systems or platforms. Such software may be written using any of a number of suitable programming languages and/or programming tools, including scripting languages and/or scripting tools. In some instances, such software may be compiled as executable machine language code or intermediate code that is executed on a framework or virtual machine. Additionally, or alternatively, such software may be interpreted.

The techniques disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more processors, perform methods that implement the various embodiments of the present disclosure discussed above. The computer-readable medium or media may be transportable, such that the program or programs stored thereon may be loaded onto one or more different computers or other processors to implement various aspects of the present disclosure as discussed above.

The terms "program" or "software" are used herein to refer to any type of computer code or set of computer-executable instructions that may be employed to program one or more processors to implement various aspects of the present disclosure as discussed above. Moreover, it should be appreciated that according to one aspect of this embodiment, one or more computer programs that, when executed, perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Program modules may include routines, programs, objects, components, data structures, etc. that perform particular tasks or implement particular abstract data types. Functionalities of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields to locations in a computer-readable medium that convey relationship between the fields. However, any suitable mechanism may be used to establish a relationship between information in fields of a data structure. For instance, pointers, tags, and/or other mechanisms may be used to establish relationship between data elements.

Various features and aspects of the present disclosure may be used alone, in any combination of two or more, or in a variety of arrangements not specifically discussed in the embodiments described in the foregoing, and are therefore not limited to the details and arrangement of components set forth in the foregoing description or illustrated in the drawings. For example, aspects described in one embodiment may be combined in any manner with aspects described in other embodiments.

Also, the techniques disclosed herein may be embodied as methods, of which examples have been provided. The acts performed as part of a method may be ordered in any suitable way. Accordingly, embodiments may be constructed in which acts are performed in an order different from illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. Use of "including," "comprising," "having," "containing," "involving," "based on," and variations thereof herein, is meant to encompass the items listed thereafter and equivalents thereof as well as additional items.

The invention claimed is:

1. A computer-implemented method for selecting a velocity profile for an electric vehicle, comprising acts of:
   determining a route to be traveled by the electric vehicle based on a starting point and a destination;
   determining a plurality of parameter values, the plurality of parameter values comprising:
      at least one first parameter value for each of a plurality of road segments in a selection horizon, wherein the selection horizon is associated with the route; and
      at least one second parameter value for at least one energy storage device of the electric vehicle;
   using the plurality of parameter values to predict a plurality of velocity profiles over the plurality of road segments in the selection horizon, wherein:
      each velocity profile of the plurality of velocity profiles is predicted based on a corresponding value of at least one variable relating to a driving style of a driver of the electric vehicle;
   computing an energy consumption cost and a travel time cost for each velocity profile of the plurality of velocity profiles; and
   selecting, based on the respective energy consumption costs and the respective travel time costs, a velocity profile from the plurality of velocity profiles.

2. The method of claim 1, further comprising an act of:
   computing an overall cost for each velocity profile of the plurality of velocity profiles, at least in part by combining the respective energy consumption cost and the respective travel time cost for the velocity profile, wherein:
a first weight is applied the energy consumption cost;
a second weight is applied to the travel time cost; and
the first weight and the second weight are selected based on a driving history of the driver.

3. The method of claim 2, further comprising an act of:
determining, based on the driving history, whether the driver is an aggressive driver or a conservative driver;
in response to determining that the driver is an aggressive driver, selecting the first weight and the second weight so as to prioritize travel time over energy consumption; and
in response to determining that the driver is a conservative driver, selecting the first weight and the second weight so as to prioritize energy consumption over travel time.

4. The method of claim 2, further comprising an act of:
determining, based on the driving history, whether a current route is a commuter route for the driver;
in response to determining that the current route is not a commuter route, selecting the first weight and the second weight so as to prioritize travel time over energy consumption; and
in response to determining that the current route is a commuter route, selecting the first weight and the second weight so as to prioritize energy consumption over travel time.

5. The method of claim 1, wherein:
determining the plurality of parameter values comprises:
using a first machine learning model to estimate the at least one first parameter value for the at least one road segment in the selection horizon; and/or
using a second machine learning model to estimate the at least one second parameter value for the at least one energy storage device of the electric vehicle.

6. The method of claim 1, wherein:
the plurality of velocity profiles comprises a plurality of first velocity profiles; and
using the plurality of parameter values to predict the plurality of first velocity profiles comprises:
using the plurality of parameter values to predict a plurality of second velocity profiles;
for each second velocity profile, checking whether the second velocity profile satisfies at least one constraint; and
in response to determining that the second velocity profile does not satisfy the at least one constraint, removing or modifying the second velocity profile.

7. The method of claim 1, wherein:
predicting a velocity profile comprises:
comparing a current velocity against a selected default velocity for a current road segment; and
in response to determining that the current velocity matches the default velocity for the current road segment, predicting an end-of-segment velocity profile.

8. The method of claim 7, wherein:
predicting an end-of-segment velocity profile comprises:
determining a distance between a current position and an endpoint of the current road segment;
determining a stopping distance, a cruising distance, or a speedup distance from the endpoint of the current road segment;
determining, based on the distance between the current position and the endpoint of the current road segment, and based on the stopping distance, the cruising distance, or the speedup distance, a time to brake, cruise, or accelerate; and
applying at least one driver behavior adjustment.

9. The method of claim 7, wherein:
predicting a velocity profile further comprises:
in response to determining that the current velocity is less than the default velocity for the current road segment, determining an acceleration value and a distance for an acceleration phase.

10. The method of claim 7, wherein:
predicting a velocity profile further comprises:
in response to determining that the current velocity is greater than the default velocity for the current road segment:
determining whether to brake and/or cruise; and
determining a deceleration value for braking and/or cruising, and a distance for a deceleration phase.

11. A system comprising:
at least one computer processor; and
at least one computer-readable medium having stored thereon instructions which, when executed, program the at least one computer processor to perform a method, the method comprising acts of:
determining a route to be traveled by an electric vehicle based on a starting point and a destination;
determining a plurality of parameter values, the plurality of parameter values comprising:
at least one first parameter value for each of a plurality of road segments in a selection horizon, wherein the selection horizon is associated with the route; and
at least one second parameter value for at least one energy storage device of the electric vehicle;
using the plurality of parameter values to predict a plurality of velocity profiles over the plurality of road segments in the selection horizon, wherein:
each velocity profile of the plurality of velocity profiles is predicted based on a corresponding value of at least one variable relating to a driving style of a driver of the electric vehicle;
computing an energy consumption cost and a travel time cost for each velocity profile of the plurality of velocity profiles; and
selecting, based on the respective energy consumption costs and the respective travel time costs, a velocity profile from the plurality of velocity profiles.

12. The system of claim 11, wherein the method further comprises an act of:
computing an overall cost for each velocity profile of the plurality of velocity profiles, at least in part by combining the respective energy consumption cost and the respective travel time cost for the velocity profile, wherein:
a first weight is applied the energy consumption cost;
a second weight is applied to the travel time cost; and
the first weight and the second weight are selected based on a driving history of the driver.

13. The system of claim 12, wherein the method further comprises acts of:
determining, based on the driving history, whether the driver is an aggressive driver or a conservative driver;
in response to determining that the driver is an aggressive driver, selecting the first weight and the second weight so as to prioritize travel time over energy consumption; and in response to determining that the driver is a conservative driver, selecting the first weight and the second weight so as to prioritize energy consumption over travel time.

14. The system of claim 12, wherein the method further comprises acts of:
determining, based on the driving history, whether a current route is a commuter route for the driver;
in response to determining that the current route is not a commuter route, selecting the first weight and the second weight so as to prioritize travel time over energy consumption; and
in response to determining that the current route is a commuter route, selecting the first weight and the second weight so as to prioritize energy consumption over travel time.

15. The system of claim 11, wherein:
determining the plurality of parameter values comprises:
using a first machine learning model to estimate the at least one first parameter value for the at least one road segment in the selection horizon; and/or
using a second machine learning model to estimate the at least one second parameter value for the at least one energy storage device of the electric vehicle.

16. The system of claim 11, wherein:
the plurality of velocity profiles comprises a plurality of first velocity profiles; and
using the plurality of parameter values to predict the plurality of first velocity profiles comprises:
using the plurality of parameter values to predict a plurality of second velocity profiles;
for each second velocity profile, checking whether the second velocity profile satisfies at least one constraint; and
in response to determining that the second velocity profile does not satisfy the at least one constraint, removing or modifying the second velocity profile.

17. The system of claim 11, wherein:
predicting a velocity profile comprises:
comparing a current velocity against a selected default velocity for a current road segment; and
in response to determining that the current velocity matches the default velocity for the current road segment, predicting an end-of-segment velocity profile.

18. The system of claim 17, wherein:
predicting an end-of-segment velocity profile comprises:
determining a distance between a current position and an endpoint of the current road segment;
determining a stopping distance, a cruising distance, or a speedup distance from the endpoint of the current road segment;
determining, based on the distance between the current position and the endpoint of the current road segment, and based on the stopping distance, the cruising distance, or the speedup distance, a time to brake, cruise, or accelerate; and
applying at least one driver behavior adjustment.

19. The system of claim 17, wherein:
predicting a velocity profile further comprises:
in response to determining that the current velocity is less than the default velocity for the current road segment, determining an acceleration value and a distance for an acceleration phase.

20. At least one computer-readable medium having stored thereon instructions which, when executed, program at least one computer processor to perform a method, the method comprising acts of:
determining a route to be traveled by an electric vehicle based on a starting point and a destination;
determining a plurality of parameter values, the plurality of parameter values comprising:
at least one first parameter value for each of a plurality of road segments in a selection horizon, wherein the selection horizon is associated with the route; and
at least one second parameter value for at least one energy storage device of the electric vehicle;
using the plurality of parameter values to predict a plurality of velocity profiles over the plurality of road segments in the selection horizon, wherein:
each velocity profile of the plurality of velocity profiles is predicted based on a corresponding value of at least one variable relating to a driving style of a driver of the electric vehicle;
computing an energy consumption cost and a travel time cost for each velocity profile of the plurality of velocity profiles; and
selecting, based on the respective energy consumption costs and the respective travel time costs, a velocity profile from the plurality of velocity profiles.

* * * * *